(12) United States Patent
Margaritova et al.

(10) Patent No.: US 10,908,289 B2
(45) Date of Patent: Feb. 2, 2021

(54) NAVIGATION SYSTEM, NAVIGATION METHOD AND RECEIVERS

(71) Applicant: SENSONICA LIMITED, Nicosia (CY)

(72) Inventors: Oxana Margaritova, Toscolano-Maderno (IT); Andrey Khodkin, Moscow (RU)

(73) Assignee: SENSONICA LIMITED, Nicosia (CY)

( * ) Notice: Subject to any disclaimer, the term of this patent is extended or adjusted under 35 U.S.C. 154(b) by 0 days.

(21) Appl. No.: 16/418,688

(22) Filed: May 21, 2019

(65) Prior Publication Data

US 2019/0271779 A1    Sep. 5, 2019

Related U.S. Application Data

(63) Continuation-in-part of application No. 16/195,326, filed on Nov. 19, 2018.

(30) Foreign Application Priority Data

Nov. 19, 2017 (EP) ..................... 17202468

(51) Int. Cl.
| | | |
|---|---|---|
| *G01S 17/36* | (2006.01) | |
| *G01S 5/10* | (2006.01) | |
| *G01S 5/16* | (2006.01) | |
| *G01S 5/14* | (2006.01) | |

(52) U.S. Cl.
CPC ................ *G01S 17/36* (2013.01); *G01S 5/10* (2013.01); *G01S 5/145* (2013.01); *G01S 5/16* (2013.01)

(58) Field of Classification Search
CPC ............. G01S 17/36; G01S 5/10; G01S 5/145
See application file for complete search history.

(56) References Cited

U.S. PATENT DOCUMENTS

| | | | |
|---|---|---|---|
| 3,539,806 A | | 11/1970 | Humphrey |
| 3,839,639 A | * | 10/1974 | Hughes ................... G01S 17/02 250/302 |
| 5,658,673 A | | 8/1997 | Holwitt et al. |
| 10,527,639 B2 | | 1/2020 | Margaritova et al. |
| 2006/0214113 A1 | | 9/2006 | Kleinerman |
| 2012/0203086 A1 | * | 8/2012 | Rorabaugh .......... A61B 3/1173 600/321 |
| 2014/0034930 A1 | | 2/2014 | Seo et al. |
| 2015/0076360 A1 | | 3/2015 | Menge |
| 2016/0172605 A1 | | 6/2016 | Seo et al. |
| 2016/0178542 A1 | | 6/2016 | Lingren et al. |
| 2016/0197282 A1 | | 7/2016 | Tanimoto et al. |
| 2016/0268516 A1 | | 9/2016 | Tanaka et al. |

(Continued)

FOREIGN PATENT DOCUMENTS

| | | |
|---|---|---|
| GB | 2440588 | 2/2008 |
| WO | 2015038861 | 3/2015 |

OTHER PUBLICATIONS

Dias et al., "Photo physics of thermally activated delayed fluorescence molecules," Methods and Applications in Fluorescence, vol. 5, No. 1, 012001, Mar. 9, 2017, 26 pages.

(Continued)

*Primary Examiner* — Hugh Maupin
(74) *Attorney, Agent, or Firm* — Hanley, Flight & Zimmerman, LLC

(57) ABSTRACT

TADF receivers for a navigation system, TADF navigation system and method using TADF material based navigation.

15 Claims, 9 Drawing Sheets

(56) References Cited

U.S. PATENT DOCUMENTS

| | | | |
|---|---|---|---|
| 2017/0067828 | A9 | 3/2017 | Geddes |
| 2017/0133617 | A1 | 5/2017 | Seo et al. |
| 2017/0162817 | A1 | 6/2017 | Ogiwara et al. |
| 2017/0229670 | A1 | 8/2017 | Laitar et al. |
| 2017/0256733 | A1 | 9/2017 | Tsukamoto et al. |
| 2017/0271597 | A1 | 9/2017 | Miyata et al. |
| 2017/0284940 | A1* | 10/2017 | Butte ............... G01N 21/6408 |
| 2018/0226600 | A1 | 8/2018 | Seo et al. |
| 2018/0323396 | A1 | 11/2018 | Tsukamoto et al. |
| 2018/0337360 | A1 | 11/2018 | Huang et al. |
| 2019/0067615 | A1 | 2/2019 | Seo et al. |
| 2019/0154720 | A1 | 5/2019 | Margaritova et al. |
| 2019/0154849 | A1 | 5/2019 | Margaritova et al. |

OTHER PUBLICATIONS

European Patent Office, "Extended European Search Report," issued in connection with European Patent Application No. 17202468.9, dated Jun. 7, 2018, 9 pages.

European Patent Office, "Extended European Search Report," issued in connection with European Patent Application No. 18000910.2, dated Apr. 17, 2019, 15 pages.

European Patent Office, "Examination Report," issued in connection with European Patent Application No. 17202468.9, dated Apr. 9, 2019, 10 pages.

European Patent Office, "Extended European Search Report," issued in connection with European Patent Application No. 18000909.4, dated Feb. 1, 2019, 14 pages.

William T. Joines et al., "Electromagnetic Emission From Humans During Focused Intent," The Journal of Parapsychology, Oct. 1, 2012, XP55574740, retrieved from the Internet: URL:http://www.rhine.org/images/jp/v76Fall2012/dJPF2012Joines.pdf, 20 pages.

Beverly Rubik et al., "Effects of Intention, Energy Healing, and Mind-Body States on Biophoton Emission Introduction," The Journal of Natural and Social Philosophy, Apr. 2, 2017, XP55574742, retrieved from the Internet:URL:https://pdfs.semanticscholar.org/706b/86f2b35fb0100105431e3edce06d019664f9.pdf, 22 pages.

Nobuhiro Yanai et al., "New Triplet Sensitization Routes for Photon Upconversion: Thermally Activated Delayed Fluorescence Molecules, Inorganic Nanocrystals, and Singlet-to-Triplet Absorption," Accounts of Chemical Research., vol. 50, No. 10, Sep. 20, 2017, pp. 2487-2495, XP55574763, 10 pages.

Tibor Jacob Hajagos, "Plastic Scintillators for Pulse Shape Discrimination of Particle Types in Radiation Detection," Jun. 6, 2017, XP855572429, retrieved from the Internet: URL:https://search.proquest.com/docview/1916898229?pq-origsite=gscholar, 150 pages.

United States Patent and Trademark Office, Notice of Allowance, issued in connection with U.S. Appl. No. 16/195,357, dated Apr. 11, 2019, 31 pages.

United States Patent and Trademark Office, Notice of Allowance, issued in connection with U.S. Appl. No. 16/195,357, dated Aug. 19, 2019, 8 pages.

United States Patent and Trademark Office, Non-final Office Action, issued in connection with U.S. Appl. No. 16/195,326, dated Oct. 18, 2019, 14 pages.

United States Patent and Trademark Office, Corrected Notice of Allowability, issued in connection with U.S. Appl. No. 16/195,357, dated Nov. 27, 2019, 6 pages.

United States Patent and Trademark Office, Final Office Action, issued in connection with U.S. Appl. No. 16/195,326, dated Jan. 30, 2020, 19 pages.

United States Patent and Trademark Office, Advisory Action, issued in connection with U.S. Appl. No. 16/195,326, dated Apr. 14, 2020, 6 pages.

United States Patent and Trademark Office, Non-final Office Action, issued in connection with U.S. Appl. No. 16/195,341, dated Apr. 29, 2020, 8 pages.

United States Patent and Trademark Office, Notice of Allowance, issued in connection with U.S. Appl. No. 16/195,326, dated Jun. 10, 2020, 11 pages.

J.L. Kiel, "Molecular Dosimetry", Radio Frequency Radiation Dosimetry and its Relationship to the Biological Effects of Electromagnetic Fields, Springer Netherlands, Dordrecht, pp. 227-237, Jan. 1, 2000, XP809510393, retrieved from the Internet: URL:https://link.springer.com/chapter/10.1007/978-94-011-4191-8_25, 12 pages.

Mehmet Yuksel et al., "Dosimetric Characteristics of Anhydrous Borax," Sep. 2-4, 2015, XP55540889, Retrieved from the Internet:URL:https://www.researchgate.net/publication/282505033_Dosimetric_Characteristics_of_Anhydrous_Borax, 6 pages.

United States Patent and Trademark Office, Corrected Notice of Allowability, issued in connection with U. S. Appl. No. 16/195,326, dated Aug. 3, 2020, 11 pages.

Mehmet Yuksel, Dogal ve Katkilanmis Bor Minerallerinin Dozimetre Gelistirmek Amaciyla Termoluminesans (TL) Yontemi Kullanilarak Calisilmasi (Turkce) Investigating Natural and Doped Boron Minerals Using Thermoluminescence (TL) Method for the Purpose of Development of a Dosimeter (English), 2013, 255 pages.

United States Patent and Trademark Office, Corrected Notice of Allowability, issued in connection with U.S. Appl. No. 16/195,326, dated Sep. 9, 2020, 9 pages.

United States Patent and Trademark Office, Final Office Action, issued in connection with U.S. Appl. No. 16/195,341, dated Nov. 25, 2020, 9 pages.

\* cited by examiner

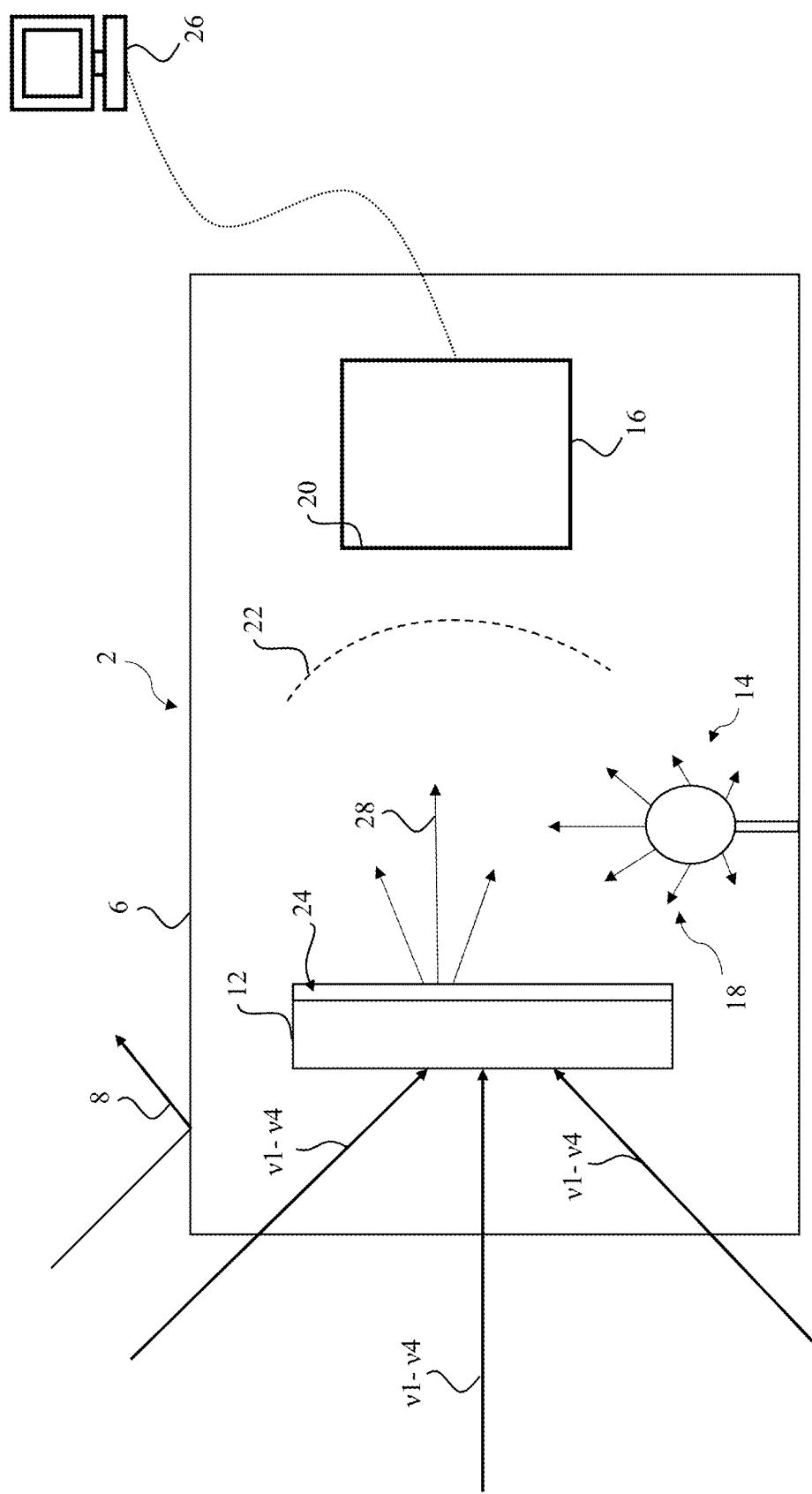

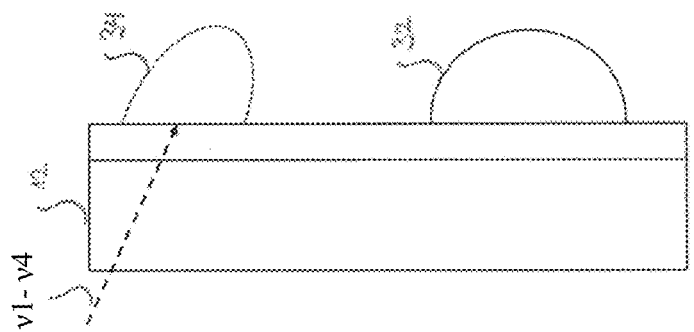

NAVIGATION SYSTEM, NAVIGATION METHOD AND RECEIVERS

FIELD OF THE INVENTION

The present invention relates, generally, to the field of navigation and, more particularly, to TADF (thermally activated delayed fluorescence) material based navigation.

In particular, TADF receivers for a navigation system, a TADF navigation system and a method using TADF material based navigation are disclosed.

BACKGROUND OF THE INVENTION

Conventional navigation systems may utilize reference signals from Earth's artificial satellites that are currently deployed or being deployed within Earth's orbit for navigation. Such a system is commonly referred to as global navigation satellite system (GNSS).

However, such conventional navigation systems have significant limitations. For example, the functioning of satellite systems requires constant maintenance of both space and ground segments, including satellite replacement and upkeep. Satellite segments are also sensitive to natural events like solar flares and the like and their placement in an orbit around Earth requires high technical effort and cost.

Furthermore, X-ray based pulsar navigation has been suggested for navigation. However, such systems detect electromagnetic radiation and, thus, only work in open space as X-ray radiation is absorbed by the Earth's atmosphere. If located on Earth, these systems require very bulky antenna constructions or large antenna arrays to register the X-ray radiation.

Objection of the Invention

An object of the present invention is to provide an improved navigation system, navigation method and receivers.

SUMMARY OF THE INVENTION

To solve the above object, the present invention provides apparatus and method subject-matter according to the accompanying independent claims, wherein variations, embodiments and examples thereof are defined in accompanying dependent claims.

More particularly, the present invention provides a directional receiver for a navigation system, comprising:
a computing device,
a receiving section for receiving signals in a sector of interest,
    the signals comprising unfocused signals and focused signals,
a detection layer comprising thermally activated delayed fluorescence TADF material, the thermally activated delayed fluorescence TADF material having a plurality of excitation frequencies,
an excitation radiation source device adapted to emit excitation radiation having at least one of the plurality of excitation frequencies to excite the TADF material, wherein
    the TADF material exhibiting upon excitation with excitation radiation, a thermally activated delayed fluorescence TADF emission,
    the TADF material having a TADF emission pattern without exposure to focused signals and exhibiting a different TADF emission pattern with exposure to focused signals,
a radiation detector device communicatively coupled with the computing device, the radiation detector device being adapted to detect TADF emission from the detection layer and provide respective detection data to the computing device,
an optical system being arranged between the detection layer and the radiation detector device,
the computing device being adapted to compute detection data from the radiation detector device to:
determine a first focused signal in the sector of interest,
determine at least a first spectral density of the first focused signal at a first time and a second spectral density of the first focused signal at a second time,
identify, on the basis of at least the first and second determined spectral density, a first source the first focused signal originates from,
determine known physical parameters and known spherical coordinates associated with the identified source;
determine a phase shift for the first focused signal;
compute a pseudo-range to the first source based on the determined/derived physical parameters and/or the phase shift.

The computing device of the directional receiver may be further adapted to compute detection data from the radiation detector device to:
generate one or more data sets;
determine, on the basis of at least the first and second spectral densities, whether the first focused signal is a stable signal;
estimate/determine and/or remove unfocused signals in the one or more data sets in the sector of interest.

The present invention further provides a discrete receiver for a navigation system, comprising:
a computing device,
a receiving section for receiving signals in a substantially semi-omnidirectional sector of interest,
    the signals comprising unfocused signals and focused signals,
a detection layer comprising thermally activated delayed fluorescence TADF material, the thermally activated delayed fluorescence TADF material having a plurality of excitation frequencies,
an excitation radiation source device adapted to emit excitation radiation having at least one of the plurality of excitation frequencies to excite the TADF material, wherein
    the TADF material exhibiting upon excitation with excitation radiation, a thermally activated delayed fluorescence TADF emission,
    the TADF material having a TADF emission pattern without exposure to focused signals and exhibiting a different TADF emission pattern with exposure to focused signals,
a radiation detector device communicatively coupled with the computing device, the radiation detector device being adapted to detect TADF emission from the detection layer and provide respective detection data to the computing device, the computing device being adapted to compute detection data from the radiation detector device to:
generate one or more data sets;
analyze the focused signals of all sources in the sector of interest to determine the overall frequency pattern in the sector of interest,
identify, on the basis of the overall frequency pattern, individual known frequency patterns,
match the identified individual frequency patterns to known frequency patterns related to individual known sources,
determine/derive known physical parameters and/or spherical coordinates associated with the identified sources;
determine, for each matching frequency pattern, a phase shift of the focused signal of the known source,
compute the spherical coordinates of the discrete receiver in relation to a coordinate system.

The matching or the comparison between the identified individual frequency patterns to known frequency patterns related to individual known sources (e.g. in a stellar map or database) carried out by the discrete receiver may allow the same to triangulate its position and to navigate (i.e. measure its spherical coordinates in relation to a coordinate system).

Furthermore, present invention provides a navigation system, comprising:
one or more of a directional receiver(s);
one or more of a discrete receiver(s);
combinations of one or more of directional receiver(s) with one or more of discrete receiver(s).

The directional and/or the discrete receiver for a navigation system according to the invention may be a device or apparatus that receives, collects, detects, acquires and/or that is at least exposed to one or more signals. The signals may originate from one or more different sources in space and may be a mixture of different signals such as point-like signals and/or isotropic signals. These signals may then be detected, processed and used by the directional and/or the discrete receiver for navigation.

It should be noted, however, that for a navigation system according to the present invention, artificial transmitters, such as satellites used for GNSS, are not required. Thus, a navigation system according to the present invention may be constituted or constructed by one or more (directional and/or discrete) receivers which may utilize one or more signals. The signals may originate from different sources being e.g., natural, already existing/present, pre-determined/measured and/or pre-categorized sources of radiation e.g. in space/sky.

For a navigation system according to the invention, either one or more directional receiver(s) may be employed/used alone, or in combination with one or more discrete receiver(s). Additionally or alternatively, it is also possible to employ/use one or more discrete receiver(s) alone, or in combination with one or more discrete receiver(s) for a navigation system according to the invention. As such, the navigation system according to the present invention may provide global coverage and may be used for navigation anywhere, e.g. on Earth and/or in space.

The directional and/or discrete receiver may be configured to receive/detect signals from different directions, angles, degrees, field of view, coordinates, points, regions in e.g. the sky and/or in space. To do so, both the directional and the discrete receiver comprise a receiving section or aperture. The receiving section may define the field of view of the receiver.

The field of view may be referred to as the sector of interest, i.e. a sector or section of space in which detectable (radiation) sources are located. The sector of interest may be a portion or section of the sky often also referred to as a solid angle that is usually expressed as an angular area viewed by the instrument, e.g. in square degrees, or for higher magnification instruments, in e.g. square arc-minutes. The field of view of the directional receiver is different, particularly smaller, from the field of view of the discrete receiver.

The directional receiver comprises one or more optical systems that may be a lens or the like to direct, refract, guide, deflect, bend and/or focus the incoming signals and/or the radiation emitted by the detection layer. For example, the signals and/or emitted radiation from the detection layer may be directed to one or more radiation detection devices. To this end, the directional receiver may function similarly to a telescope. In the experiments, a section of interest, i.e. the area of space or field of view was chosen for the directional receiver to be 2 by 2 degrees. The area of space or field of view can, however, be also varied to be any other required field of view.

In cases where the optical system is omitted, the receiver may be used and referred to as a discrete receiver. Both the directional and the discrete receiver are able to detect, measure, collect, acquire, track, find or receive signals from the one or more (radiation) sources located in space.

However, the spherical coordinates of such sources may be determined by using one or more of a discrete and/or a directional receiver or combinations thereof.

By the use of a directional receiver, however, not only spherical coordinates, but also orientation angles may be determined. Besides, with a directional receiver, new sources may be determined, defined, categorized, located to create stellar maps by means of the receiver itself. One receiver is generally enough to determine new sources, but the use of more than one receiver may increase the receive aperture and/or increase a signal to noise ratio.

The discrete receiver has a wider receiving section than the directional sensor, i.e. instead of covering a particular and/or preselected field of view, the discrete receiver may receive all signals present in an omni-directionally, semi omni-directionally etc. field of view. In any case, however, the field of view covered by the discrete receiver is greater than the field of view covered by the directional receiver.

The TADF material may have an excitation frequency range, i.e. a plurality of excitation frequencies. As such, a TADF molecule may be excited by a first frequency to a first excited state. Another (excitation) frequency may excite a TADF molecule to a second, e.g. energetically higher, excited state. In other words, the TADF material can be excited to one or more excited state by the use of one or more (excitation) frequencies.

In the following, when reference to a "receiver" is made, the features referred to both apply for the discrete and/or directional receiver, except specifically noticed otherwise. The features may also apply for each of the receivers alone or for both in combination, except specifically noticed otherwise.

Furthermore, when reference to a "receiver" is made, it means that either one or more of a discrete receiver, one or more of a directional receiver or a combination of one or more directional and/or one or more of a discrete receiver may either be used or is/are able to carry out the features specified, except specifically noticed otherwise.

The receiving section of the receiver may be to receive one or more signals in a sector of interest originating form one or more known and/or unknown sources. The received signals in a sector of interest may comprise focused and/or unfocussed signals.

Unfocused signals are signals from a variety of sources affecting the actual measurement. As such, unfocused signals may be, for example, background noise in the sector of interest, i.e. any/all other signal(s) other than the (actual) signals to be used for navigation. Unfocussed signals or background may be related to cosmic neutrino background, solar neutrinos, the universes background radiation, relic neutrino fluxes, temperature effects or the like.

Contrary thereto, focused signals are referred to as the actual signals that are used by the receiver for navigation.

Focused signals may originate from point-like sources in the sector of interest. A point-like source may be regarded as a single, identifiable and/or localized source of, e.g., radiation. For example, focused signals may be regarded as compact or point-like signals in the space domain. For example, signals form pulsars always have a compact spectrum, because their radiation is affected (e.g. modulated) by their rotation. For example, focused signals may have certain patterns in time and/or frequency domain, e.g., static, dynamic, reoccurring, periodic, harmonic, repeating, predictable or the like. Their parameters may be stable and/or predictable over time, such as, pulses, rotation periods, or rotation frequency of pulsars or the like.

In an experimental setup, sources having harmonic signals with stable frequencies have been used. It should also be noted that different focused signals of different point-like sources are used for navigation. In other words, a first focused signal may be associated with a first source and a subsequent focused signal may be associated with a second source being different from the first source and so on.

A point-like source may have negligible extent differentiating it form other signals, like background noise, which, in comparison, can be considered as being rather uniform and/or isotropic as well as weaker than the actual signals used for navigation (focused signals).

Focused signals are comprised of radiation or are preferably related to radiation, wherein the radiation may have low or very low energy, low or very low amplitude and/or cross section such as neutrino and/or gravitational radiation. Also, focused signals may be related to ultra-high energy cosmic rays or even to yet unknown radiation.

The focused signals preferably result/originate from (known; point-like) and different sources such as pulsars, quasars, supernovae, gamma-ray bursts, galaxies, clusters of galaxies, interacting or merging galaxies, star systems, black holes and the like, as these objects have physical parameters that are stable and/or predictable over time.

The term "known" used herein for term's like sources, physical parameters, spherical coordinates, frequency patterns etc. refers to the fact that the same have already been measured, defined, determined, classified, ranged, ordered, specified, localized, categorized, set, identified or the like before.

For example, due to astronomical measurements using conventional telescopes, radio arrays etc. the spherical coordinates of, e.g., pulsars have been accurately measured and collected in a data base along with their exact position/ location in space (spherical coordinates) in relation to a certain coordinate system. Such databases may be referred to as stellar maps. Thus, they may be referred to as being "known".

As set forth, a plurality of known sources may be found in databases, sky maps or stellar maps in which their location (i.e. in spherical coordinates) are marked along with their physical properties such as amplitude, frequency, brightness, size, jitter, rotational frequency etc. The coordinate system used may be selected/specified/defined both for the receiver and/or one or more of the (known) sources.

For example, known sources may be pulsars, i.e. highly magnetized rotating neutron stars that emit gravitational and/or neutrino radiation. Pulsars are very dense and have regular rotational periods that results in precise intervals between pulses that range from milliseconds to seconds for an individual pulsar. Observations of pulsars were used to indirectly confirm the existence of gravitational radiation.

Known sources may also emit gravitational waves that may be received by one or more receivers and, thus, used for navigation by the present invention. In other words, gravitational waves may also constitute a focused signal. Gravitational waves are disturbances in the curvature (fabric) of spacetime, generated by accelerated masses, that propagate as waves outward from their source at the speed of light. In other words, gravitational waves are radiated by objects whose motion involves acceleration and its change.

Known sources may also be quasars or extremely luminous active galactic nuclei (AGN). The term "quasar" originated as a contraction of quasi-stellar (star-like) radio source. Quasars occur in the centers of galaxies, wherein some host-galaxies are strongly interacting or merging galaxies. As with other categories of AGN, the observed properties of a quasar depend on many factors including the mass of the black hole, the rate of gas accretion, the orientation of the accretion disk relative to the observer, the presence or absence of a jet, and the degree of obscuration by gas and dust within the host galaxy.

Other known sources may also be used for navigation as long as their parameters change in accordance to known and/or predictable law (e.g. periodically). For example, radiation being modulated by the own rotation and orbital movement of its source may be used.

It should be noted that the receiver of the present invention may be used to draw and/or create their own (new) stellar map of known sources. Such newly created stellar maps may subsequently be used for navigation in the same way as other stellar maps.

However, experiments show that the receiver is able to detect the aforementioned known sources quite accurately. According to experimental results, it seems that gravitational radiation (e.g. gravitational waves) and/or neutrino radiation and/or even yet unknown radiation emitted by such known sources is determined/detected/measured by the receiver. This radiation may then be used for navigation accordingly.

The coordinate system used may be selected or defined to be any coordinate system in which objects, i.e. known sources, in spherical coordinates may be located/mapped. For example, celestial coordinate systems such as a horizontal coordinate system where the observer is in the center, a equatorial or ecliptic coordinate system where the Earth (geocentric) or the Sun (heliocentric) is in the center, a galactic (sun in the center) or a supergalactic coordinate system may be used to specify positions of the receiver and known sources. Other coordinate systems may similarly be selected, defined and/or used for navigation using one or more receivers.

Furthermore, the sources having known positions in space, i.e. known spherical coordinates, may also have known and/or pre-determined and/or pre-measured physical parameters, comprising one or more of the following:
  amplitude;
  phase;
  Doppler shift;
  rotational frequency;

rotational speed;
rotational energy;
rotation period;
angular momentum;
jitter;
periodical signal (pulse) shape;
brightness;
luminosity;
spectrum;
size (e.g. radius);
mass;
distance with reference to a selected coordinate system;
type of source (e.g. pulsar, white dwarf, quasar, black hole etc.);
temperature;
composition;
shape (galaxies)
emitted radiation;
or the like or any other that may be found in stellar maps.

Preferably, for navigation, stable focused signals are used/required. The term "stable" means that the focused signals have characteristics that can be considered as being substantially constant, periodic and/or harmonic over time. To this end, the signal characteristics are predictable, i.e. static or dynamic. For example, a stable signal may be considered as being a focused signal (i.e. a signal from a point-like source), when a first spectral density at a first time and a second spectral density at a second time are constant, i.e. having at least one spectral peak of constant frequency. Monochromatic signals with stable phase may also be used. Thus, the focused signals require at least stable temporal and/or frequential characteristics to be used for navigation.

Any signal that can be represented as a variable that varies in time has a corresponding frequency spectrum. The spectral density (or power spectral density) of the signal describes the power present in the focused signal as a function of frequency, per unit frequency. Power spectral density is commonly expressed in watts per hertz. The spectral density of a random signal from a sequence of time samples may be determined and/or estimated. Depending on what is known about the signal, estimation/determination techniques can involve parametric or non-parametric approaches, and may be based on time-domain or frequency-domain analysis.

Pseudo range may be regarded as the distance (or even pseudo-distance) between a known source (e.g. in space), the focused signal originates from and the receiver's position/location (e.g. on Earth or also in space).

The receiver's coordinates (e.g. on Earth or in space) may be determined using the spherical coordinates and the determined pseudo ranges to, e.g. three or more sources.

For example, the signals of three sources may be sufficient if, e.g., a precise time measurement is carried out along therewith (e.g. upon reception of the signal; arrival times). The signals of four sources may be sufficient if, e.g., no precise time measurement is carried out. In any case, however, the number of signals sufficient for navigation may vary and may depend on additional/other measurements or features.

Pulsars, for example, may be considered as natural cosmic clocks. On long timescales they may even rival the precision of terrestrial atomic clocks. Due to the fact that the physical parameters, e.g. their pulse rate/times, are known (i.e. pre-determine in other experiments) a technique called pulsar timing may be applied. To this end, the exact measurement of pulse arrival times may be measured by a receiver according to the present invention. In this way, pulsars may be used as natural navigation beacons. By comparing pulse arrival times measured, e.g. on-board a spacecraft, on Earth, or even underground, with predicted/known pulse arrivals, the spacecraft position can be determined autonomously and with high accuracy everywhere.

The computing device of the receiver according to the present invention may be further adapted to:
determine a speed of the receiver relative to the first identified source by—determining a Doppler shift between
the first or second determined spectral densities of the first focused signal and
the known spectral density of the first focused signal of the first source.

The computing device may be further adapted to compute detection data from the radiation detector device to:
determine, in addition to the first focused signal, at least
a second focused signal and
a third focused signal in the sector of interest,
determine, for each of the at least three focused signals, a first spectral density at a first time and a second spectral density at a second time,
determine, on the basis of at least the first and second spectral densities, whether the at least three focused signals are stable signals; and
identify, for each of the at least three focused signals, on the basis of at least the first or the second determined spectral density, at least three sources the at least three focused signals originate from;
determine known physical parameters and known spherical coordinates associated with the at least three sources;
determine a phase shift for the at least three focused signals,
compute a pseudo-range to the at least three sources based on the determined physical parameters and/or the phase shift;
compute spherical coordinates of the receiver in relation to a coordinate system using the computed pseudo-range to the at least three sources.

The computing device may be further adapted to:
being further adapted to compute detection data from the radiation detector device (16) to:
determine a speed of the receiver relative to the at least three sources by
determining a Doppler shift between
the first or second determined spectral densities of each of the at least three focused signals and
the known spectral density of the each of the at least three focused signals of the at least three sources.

The computing device may be adapted to:
discriminate between focused and unfocused signals based on differences of these signals in a spatial and/or a temporal domain in the one or more data sets.

The computing device may be further adapted to compute detection data from the radiation detector device to determine a TADF emission pattern without exposure to the focused signals and a different TADF emission pattern with exposure to the focused signals and to compare the determined TADF emission patterns. The computing device may be further adapted to determine one or more focused signals on the basis of such a comparison.

The receiving section of the receiver may comprise an aperture, wherein the width of the aperture is selectable to change and/or vary the sector of interest and/or to refine the number of available signals and/or sources in the sector of interest.

The computing device may be adapted to compute detection data from the radiation detector device to:
  determine an angular orientation and/or and an angular speed of the receiver in relation to the coordinate system by measuring a direction and it's variation of
    (i) the at least three focused signals in the sector of interest;
    (ii) at least one of the at least three focused signals in the sector of interest and the direction to Earths center or/and to the true/magnetic North in relation to the coordinate system.

The receiver may further comprise a device for carrying out time measurements, such as signal arrival times, of one or more of the determined focused signals to generate corresponding time information associated with the respective focused signal. Time measurements can also be carried out any (one or more) suitable physical parameter mentioned further above instead.

The computing device may generate navigational information by using
  the computed spherical coordinates of the receiver in relation to a coordinate system using the computed pseudo-range to the at least three sources along with the time information, or
  the computed spherical coordinates of the receiver in relation to a coordinate system using the computed pseudo-range to at least four sources without time information.

The receiver may further comprise a housing accommodating the components of the receiver;
  the size of the receiver being equal or less than a cubic decimeter and being reducible in size by one or more order(s) of magnitude without performance loss;
  the detector device being a CCD camera;
    being able to compute detection data from the radiation detector device during and/or following radiation emission form the excitation radiation source device,
  wherein the CCD camera provides the data set in an image, spatial, frequency and/or time domain;
  the one or more data sets being two-dimensional frames comprising focused and unfocused signals, wherein the unfocused signals in each frame are determined by the computing device by
    determining a mean brightness for every pixel in the frame by receiving signals from different sectors of interest and by
    computing an average deviation in brightness across each frame and
    subtracting the average deviation from each frame,
wherein the receiver further comprises:
  a control device for controlling the operation of the excitation radiation sources device, wherein the control device is adapted to operate the excitation radiation source device in a constant emission mode and/or a variable/modifiable emission mode, comprising pulsed and/or periodical emission mode.

The receiving section and/or parts thereof may be placed in the housing for shielding from unwanted radiation and/or electromagnetic interference (EMI). Unwanted radiation being any radiation that will not be used for navigation.

A navigation method according to the present invention may comprise:
  receiving signals in a sector of interest at a receiving section,
    the received signals comprising unfocused signals and focused signals,
  providing a detection layer comprising thermally activated delayed fluorescence TADF material, the thermally activated delayed fluorescence TADF material having a plurality of excitation frequencies,
  emitting excitation radiation having at least one of the plurality of excitation frequencies by means of an excitation radiation source device onto the detection layer to excite the TADF material, wherein
    the TADF material exhibiting upon excitation with excitation radiation, a thermally activated delayed fluorescence TADF emission,
    the TADF material having a TADF emission pattern without exposure to focused signals and exhibiting a different TADF emission pattern with exposure to focused signals,
  detecting TADF emission from the detection layer by means of a radiation detector device communicatively coupled with the computing device,
  providing detection data from the radiation detection device to the computing device,
  arranging an optical system between the detection layer and the radiation detector device, wherein
the method further comprises computing, by means of the computing device, detection data from the radiation detector device to:
  determine a first focused signal in the sector of interest,
  determine at least a first spectral density of a first focused signal at a first time and a second spectral density of the first focused signal at a second time,
  identify, on the basis of at least the first and second determined spectral density, a first source the first focused signal originates from;
  determine known physical parameters and known spherical coordinates associated with the identified source;
  determine a phase shift for the first focused signal;
  compute a pseudo-range to the first source based on the determined/derived physical parameters and/or the phase shift.

The method according to the present invention may further comprise computing, by means of the computing device, detection data from the radiation detector device to:
  generate one or more data sets;
  determine, on the basis of at least the first and second spectral densities, whether the first focused signal is a stable signal;
  estimate/determine and/or remove unfocused signals in the one or more data sets in the sector of interest.

The navigation method according to the present invention may further comprise:
  determining, using the computing device, a speed of the receiver relative to the first identified source by
  determining a Doppler shift between
    the first or second determined spectral densities of the first focused signal and
    the known spectral density of the first focused signal of the first source;
  wherein the method further comprises:
  computing, by means of the computing device, detection data from the radiation detector device to:
  determine, in addition to the first focused signal, at least
    a second focused signal and
    a third focused signal in the sector of interest,
  determine, for each of the at least three focused signals, a first spectral density at a first time and a second spectral density at a second time;

determine, on the basis of at least the first and second spectral densities, whether the at least three focused signals are stable signals; and identify, for each of the at least three focused signals, on the basis of at least the first and second determined spectral density, at least three sources the at least three focused signals originate from;

determine known physical parameters and known spherical coordinates associated with the at least three sources;

determine a phase shift for each of the at least three focused signals, compute a pseudo-range to each of the at least three sources based on the determined physical parameters and/or the phase shift;

compute the spherical coordinates of the receiver in relation to a coordinate system using the computed pseudo-range to each of the at least three sources.

The navigation method according to the present invention may further comprise:

computing, by means of the computing device, detection data from the radiation detector device to:

determine a speed of the receiver relative to the at least three sources by determining a Doppler shift between the first or second determined spectral densities of each of the at least three focused signals and the known spectral density of the each of the at least three focused signals of the at least three sources.

The navigation method according to the present invention may further comprise:

computing, by means of the computing device, detection data from the radiation detector device to:

determine an angular orientation and/or and an angular speed of the receiver in relation to the coordinate system by measuring a direction and it's variation of (i) the at least three focused signal in the sector of interest;

(ii) at least one of the at least three focused signals in the sector of interest and the direction to Earths center or/and to the true/magnetic North in relation to the coordinate system.

The navigation method according to the present invention may further comprise:

carrying out time measurements, such as signal arrival times, for one or more of the determined focused signals to generate corresponding time information associated with the respective focused signal, navigating using the computed spherical coordinates of the receiver in relation to a coordinate system using the computed pseudo-range to the at least three sources along with the time information, or the computed spherical coordinates of the receiver in relation to a coordinate system using the computed pseudo-range to at least four sources without time information.

The navigation method may further comprise accommodating the components of the receiver in a housing; wherein the size of the receiver being equal or less than a cubic decimeter and being reducible in size by one or more order(s) of magnitude without performance loss;

the detector device being a CCD camera;

being able to compute detection data from the radiation detector device during and/or following radiation emission form the excitation radiation source device, wherein the CCD camera provides the data set in an image, spatial, frequency and/or time domain;

the one or more data sets being two-dimensional frames comprising focused and unfocused signals, wherein the unfocused signals in each frame are determined by the computing device by:

determining a mean brightness for every pixel in the frame by receiving signals from different sectors of interest and by computing an average deviation in brightness across each frame and subtracting the average deviation from each frame, wherein the receiver further comprises:

a control device for controlling the operation of the excitation radiation sources device, wherein the control device is adapted to operate the excitation radiation source device in a constant emission mode and/or a variable/modifiable emission mode, comprising pulsed and/or periodical emission mode.

The navigation method may further comprise:

placing the receiving section or parts thereof in the housing for shielding from unwanted radiation and/or electromagnetic interference (EMI).

The navigation method may be carried out using a receiver according to the present invention.

The discrete receiver may also further comprise a device for carrying out time measurements, such as signal arrival times, of one or more of the determined focused signals to generate corresponding time information associated with the respective focused signal, wherein the computing device of the discrete receiver being further adapted to compute detection data from the radiation detector device to:

generate navigational information by using the computed spherical coordinates of the receiver in relation to a coordinate system using the computed pseudo-range to at least three sources along with the time information, or the computed spherical coordinates of the receiver in relation to a coordinate system using the computed pseudo-range to at least four sources without time information.

The detection layer may be at least one of planar, provided in a coating material, shaped as a part of a sphere, shaped as a hollow or solid sphere, shaped as a polyhedron.

The radiation detector device may comprise at least one of a discrete radiation detector, a radiation detector array including at least two detector elements, electro-optical transducer, image intensifier tube, vacuum tube, CMOS chip a CCD chip.

The receiver may comprise at least two radiation detector devices wherein the detection layer is arranged between the at least two radiation detector devices.

The receiver may comprise a control device for controlling the operation of the excitation radiation source device, wherein the control devices is adapted to operate the excitation radiation source device in a constant emission mode and/or a variable/modifiable emission mode, comprising pulsed and/or periodical emission mode.

The computing device may be able to compute detection data from the radiation detector device during and/or following radiation emission from the excitation radiation source device.

The receiver may comprise an optical system being arranged between the detection layer and the radiation detector device.

The receiver may comprise a housing accommodating the components of the receiver.

The housing may have shielding properties for shielding of at least one of:
electro-magnetic radiation;
X-ray radiation;
ultraviolet radiation;
Gamma radiation;
corpuscular radiation, comprising alpha radiation, beta radiation, neutrons and/or protons.

The method may further comprise the steps of:
controlling the operation of the excitation radiation source device by means of a control device and
emitting radiation, by operating the excitation radiation source device, in a constant emission mode and/or a variable/modifiable emission mode, comprising pulsed and/or periodical emission mode.

According to the method of the present invention, in an excitation phase, excitation radiation is emitted onto the detection layer in order to excite the TADF material and, in a detection phase subsequent to the excitation phase, TADF emission from the detection layer is detected.

In some examples, the excitation phase and the detection phase may, at least partially, overlap. For example:
the excitation phase and the detection phase may start at the same time and may take place for the same period of time;
the excitation phase and the detection phase may start at the same time, wherein the excitation phase ends, while the detection is phase is still ongoing and is continued for some further period of time;
the detection phase takes place for a period of time, during which at least two excitation phases take place one after another with a pause therebetween (i.e. period of time without excitation), wherein the at least excitation phases may have the same duration or different durations;
the excitation phase may start and, at some point of time when the excitation phase takes place, the detection phase may also start, wherein the excitation phase may end earlier or at the same time, or later than the detection phase.

In further examples, there may a transition phase between the excitation phase and the detection phase, during which transition phase neither excitation nor detection takes place.

The method may further comprise the step of arranging an optical system between the detection layer and the radiation detector device for adjusting the TADF emission onto the radiation detector device.

The method may further comprise the steps of:
providing a housing, having shielding properties to shield at least one of:
electro-magnetic radiation,
X-ray radiation,
Ultraviolet radiation,
Gamma radiation,
Corpuscular radiation,
alpha radiation,
beta radiation,
neutrons
protons.

The method may further comprise at least one of the steps of:
calibrating the receiver for compensation of temperature related effects on the radiation detection device,
arrangement calibrating the radiation detection device as such for compensation of at least background radiation to which the radiation detection device is exposed.

The suggested navigation system, method and receivers therefore are small in size and may be used in all areas for navigation/positioning (GNSS, dead reckoning, astronavigation, inertial navigation etc.) Practically fully protected against jamming and shielding, with small sized receivers, passive nature (low power), without any artificial beacons, such system may exceed any existing navigational system.

Besides this, some configurations of system allow to get not only the coordinates and speed of the receiver, but also the orientation angles and the angular speed of the receiver. Such configurations allow to get full frame of movement parameters of the receiver by means of one sensor (or receiver). To this end, navigation and positioning of any mobile (stationary or moving) object can be provided by means of one sensor (or receiver).

SUMMARY OF THE DRAWINGS

In the description of embodiment further below, it is referred to the following drawings, which show.

DESCRIPTION OF EMBODIMENTS

Generally, features and functions referred to with respect to specific drawings and embodiments may also apply to other drawings and embodiments, unless explicitly noted otherwise.

Known conventional components, which are necessary for operation, (e.g. energy supply, 15 cables, controlling devices, processing devices, storage devices, etc.) are neither shown nor described, but are nevertheless considered to be disclosed for the skilled person.

Figure 1:
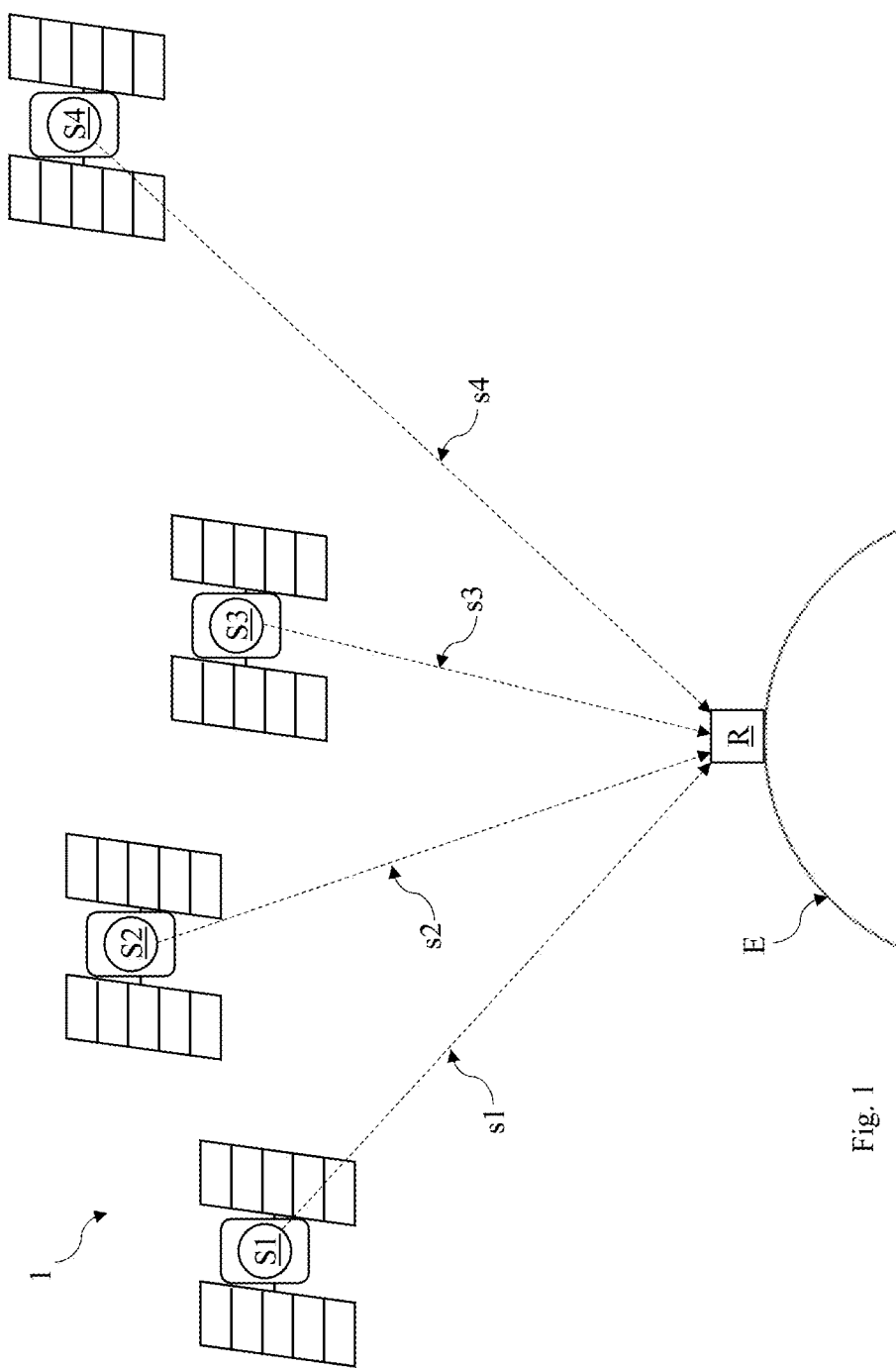
FIG. 1 a schematic illustration of a conventional global navigation satellite system (GNSS),
FIG. 2 a schematic illustration of a navigation system according to the present invention,
FIG. 3a a schematic illustration of a directional receiver according to the present invention,
FIG. 3b a schematic illustration of a discrete receiver according to the present invention,
FIG. 4 a schematic illustration of receiver's emission patterns with and without focused signals,
FIGS. 5a and 5b schematic illustrations for explanation of emission distributions with and without focused signals,
FIGS. 6a and 6b experimental results of measurements carried out with a receiver,
FIG. 7 a flow chart of a navigation method using a first signal from a first source,
FIG. 8 a flow chart of the navigation method using three signals from three different sources.

FIG. 1 schematically illustrates a conventional global navigation satellite system (GNSS) navigation system 1. Such systems use satellites S1-S4 to determine the position or location of a receiver R using (time and position) signals s1-s4 transmitted between the receiver R and a satellite S1-S4. In order to exactly determine the position of the receiver R, the signals of at least four satellites S1-S4 in sight, i.e. in the field of view of the receiver R must be used. Global coverage is achieved by a plurality of satellites orbiting the Earth E.

In order to determine the position, a conventional GNSS receiver determines the ranges to at least four satellites S1-S4 as well as their positions at time of transmitting. The pseudo ranges of each satellite are obtained by multiplying the speed of light by the time the signal has taken form the satellite to the receiver.

According to the invention, in general, the signal(s) of one or more sources are required. For example, for navigation, the signals of three sources may be sufficient if, e.g., a precise time measurement is carried out along therewith (e.g. upon reception). The signals of four sources may be sufficient if, e.g., no precise time measurement is carried out. The forth source may additionally provide location information and/or the additional time information. In any case, however, the number of signals used for navigation may vary and may depend on additional measurements or features.

Figure 2:
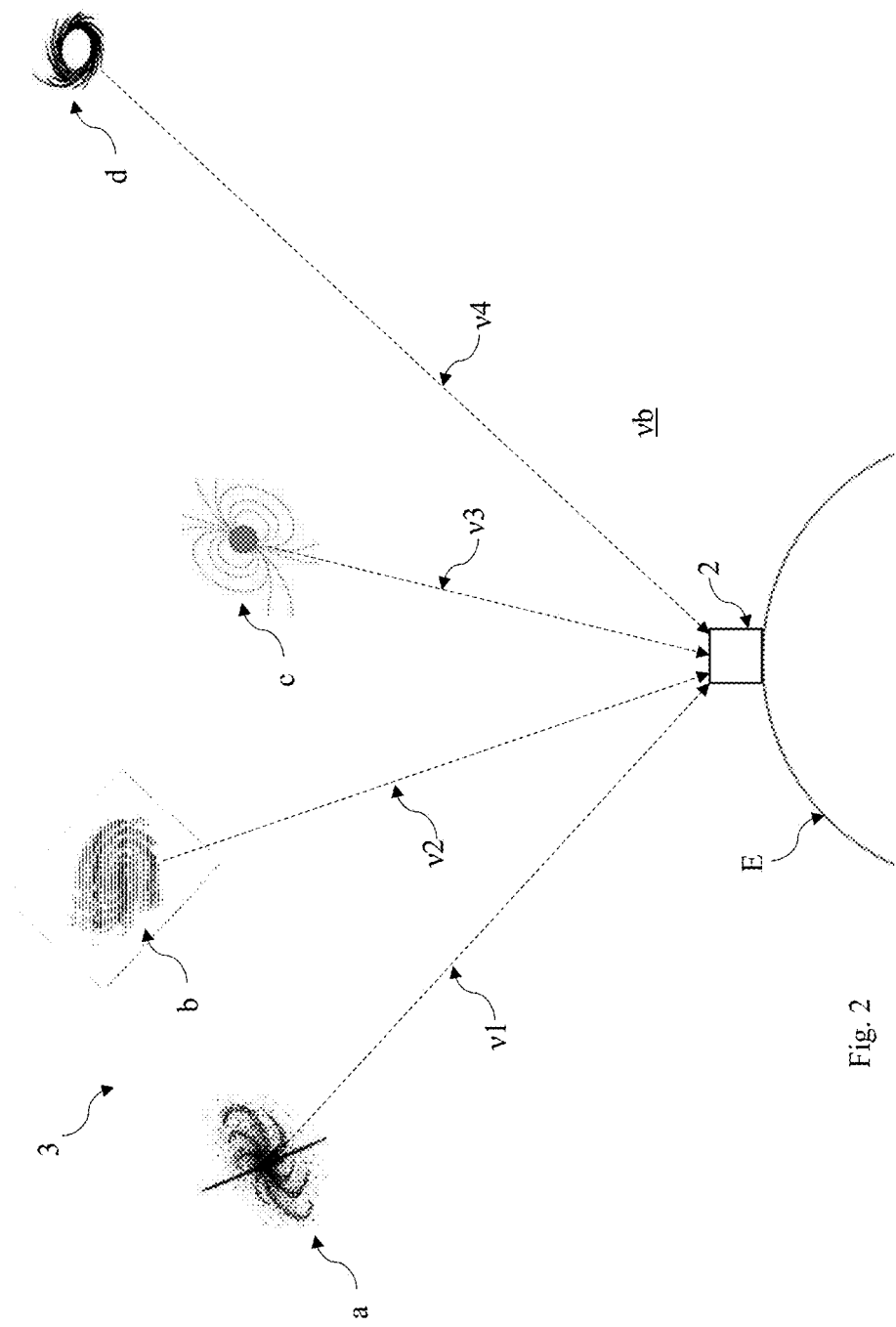

FIG. 2 schematically illustrates a navigation system 3 according to the present invention. As can be seen, artificial satellites are not required for the navigation system 3. Furthermore, constant maintenance of both space and ground segments, including satellite replacement and upkeep as well as expensive positioning of the satellites in Earth's orbit is not required.

Instead of satellites, the receiver 2 of the present invention utilizes the signals v1-v4 of known (point-like) sources comprising, e.g., quasars a, galaxies b or merging/interacting galaxies or galaxy clusters, pulsars c or black holes d or the like. The signals v1-v4 may be focused signals, i.e. point-like signals that are to be used for navigation.

Additionally, unfocussed signals vb like background radiation or noise is present. The background may be related to cosmic neutrino background, relic neutrino fluxes, solar neutrinos, the universes background radiation, temperature effects or the like.

It should be noted that one or more of a discrete receiver and/or one or more of a directional receiver may be used for navigation. Also, the receiver used does not necessarily have to be on Earth E. In contrast, the receiver according to the present invention may be also used for navigation in open space, e.g. on a space ship, and used for navigation during its mission. It should thus be noted that the receiver's navigation capabilities are not limited to navigation on Earth, but that the receiver can be used everywhere for navigation, e.g. also including navigation in deep space or on other planets etc.

Since focused signals may be related to neutrinos and/or gravitational radiation and/or even yet unknown radiation, the receiver may also be used for navigation underground, i.e. deep within Earth, in Mines, tunnels etc. (i.e. where most radiation is normally shielded and not able to reach or penetrate through).

Signals or radiation may also impinge from more than one direction, e.g. a plurality of different directions even opposing ones.

The receiver 2 comprises a housing 6. The housing 6 acts as shield against radiation 6 that shall not be detected by the receiver 2. Such radiation is referred to as shieldable radiation 8. Examples for shieldable radiation 8 include one or more of the following: visible light, neutrons, electrons, protons, myons, cosmic radiation, electro-magnetic radiation, X-ray radiation, ultraviolet radiation, Gamma radiation, corpuscular radiation, alpha radiation, beta radiation, thermal radiation, thermal disturbances.

Shieldable radiation 8 is blocked by the housing 6 so that no part of shieldable radiation 8 can enter the space defined the housing 6. This is illustrated in the drawings by arrows 8 indicting reflected shieldable radiation. However, shielding effected by the housing 6 may be (additionally or alternatively) provided by absorption or any other way ensuring that no shieldable radiation reaches the inner of the housing.

Contrary thereto, the housing 6 does not block, shield off or prohibit in any other way signals that may be measured and used for navigation, such as focused signals v1-v4. Such focused signals v1-v4 may be also referred to as measurable radiation. Examples for focused signals v1-v4 include one or more of the following: neutrinos, neutralinos, WIMPS (Weakly interacting massive particles), high penetrating cosmic rays and/or gravitational radiation such as gravitational waves. Also, focused signals v1-v4 may include yet unknown radiation that is, nevertheless, able to produce/leave/cause/generate a signal in the TADF receiver.

The housing 6 may be adapted to act as at least one of the following:
optically non-transparent shield,
thermal shield,
electromagnetic shield,
shield against at least one of UV radiation, gamma radiation, corpuscular radiation, X-rays, alpha radiation, beta radiation.

The material of the housing 6 may comprise, for example, at least one of the following:
metal (e.g. for optically non-transparent shielding),
plastic (e.g. for optically non-transparent shielding),
gas gap and/or low thermal conductivity polymers (e.g. for thermal shielding),
multi layered construction including layers of different material, for example alternating layers of material having low and high thermal conductivity, like copper foil, (e.g. for thermal shielding),
low thermal conductivity material, like polymer, (e.g. for thermal shielding),
closed (e.g. complete and/or hermetic) grounded metal coating (e.g. Al, Cu) (e.g. for electromagnetic shielding)
UV/gamma/corpuscular/X-rays/alpha/beta shield:
Aluminum (e.g. for shielding of at least one of UV radiation, gamma radiation, corpuscular radiation, X-rays, alpha radiation, beta radiation),
glass (e.g. for shielding of at least one of UV radiation, gamma radiation, corpuscular radiation, X-rays, alpha radiation, beta radiation),
textolite (e.g. for shielding of at least one of UV radiation, gamma radiation, corpuscular radiation, X-rays, alpha radiation, beta radiation),
concrete (e.g. for shielding of at least one of UV radiation, gamma radiation, corpuscular radiation, X-rays, alpha radiation, beta radiation).

An exemplary housing may have walls comprising an Aluminum sheet/layer with a thickness of at least about 10 mm; one, two or three glass layers each having a thickness of at least about 2 mm; a textolite layer with a thickness of about 1 mm with an optional cooper foil at least at one side of the textolite layer.

The distance between the inner surface of the housing 6 and the detection layer 12 may be 0 mm (i.e. no distance) or, for example, in the range of at least about 30 mm.

Further shielding can be achieved by providing a housing that—in addition to at least one of the above mentioned examples or as option thereto—is made of concrete and completely surrounds the receiver. This can be accomplished by, for example, positioning the receiver in a hollow concrete cube having 6 concrete walls with a thickness of, e.g., about 3 meters and more.

Inside the housing 6, the receiver 2 comprises a detection layer 12, which comprises at least a TADF material, i.e. material exhibiting thermally activated delayed fluorescence. The TADF material of the detection layer 12 has an excitation frequency range, where the TADF material, if being excited by radiation in the excitation frequency range, exhibits a thermally activated delayed fluorescence.

Figure 3A:
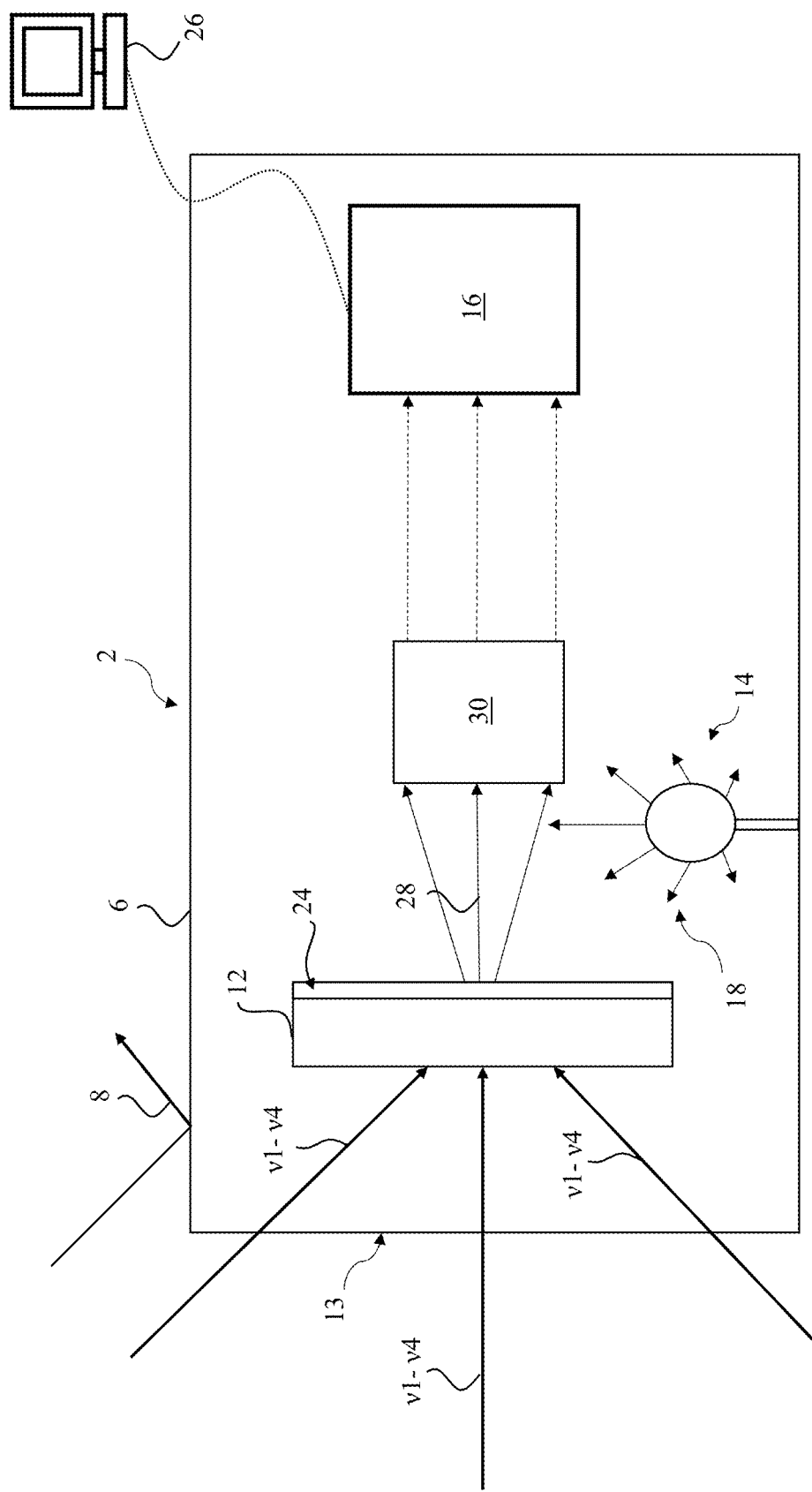

FIG. 3a schematically illustrates a directional receiver according to the present invention.

The directional receiver for a navigation system comprises:
a computing device 26,
a receiving section 13 for receiving signals in a sector of interest,
  the signals comprising unfocused signals vb and focused signals v1-v4,
a detection layer 12 comprising thermally activated delayed fluorescence TADF material, the thermally activated delayed fluorescence TADF material having a plurality of excitation frequencies,
an excitation radiation source device 14 adapted to emit excitation radiation 18 having at least one of the plurality of excitation frequencies to excite the TADF material, wherein
  the TADF material exhibiting upon excitation with excitation radiation, a thermally activated delayed fluorescence TADF 28 emission,
  the TADF material having a TADF emission pattern without exposure to focused signals v1-v4 and exhibiting a different TADF emission pattern with exposure to focused signals v1-v4,
a radiation detector device 16 communicatively coupled with the computing device 26, the radiation detector device 16 being adapted to detect TADF emission from the detection layer 12 and provide respective detection data to the computing device 26,
an optical system 30 being arranged between the detection layer 12 and the radiation detector device 16,
the computing device 26 being adapted to compute detection data from the radiation detector device 16 to:
determine a first focused signal v1-v4 in the sector of interest,
determine at least a first spectral density of the first focused signal v1-v4 at a first time and a second spectral density of the first focused signal at a second time,
identify, on the basis of at least the first and second determined spectral density, a first source the first focused signal originates from,
determine known physical parameters and known spherical coordinates associated with the identified source;
determine a phase shift for the first focused signal;
compute a pseudo-range to the first source based on the determined/derived physical parameters and/or the phase shift.

The excitation radiation source device 14 is capable of providing radiation (at least) in the excitation frequency range of the TADF material. Such radiation is referred to as excitation radiation 18. The excitation radiation source device 14 can be controlled to provide continuous excitation radiation 18, i.e. to be operated in a constant emission mode. The excitation radiation source device 14 can be controlled to provide non-continuous excitation radiation 18, i.e. to be operated in a variable emission mode, to provide, for example, pulsed and/or periodical excitation radiation.

The excitation radiation source device 18 can comprise one or more excitation radiation sources, for example, one or more LEDs. The drawings show a single excitation radiation source device 18. However, two and more excitation radiation source devices arranged adjacent to each other or spaced from each other can be employed.

The radiation detector device 16 is capable of detecting (at least) radiation provided by the detection layer 12, particularly thermally activated delayed fluorescence from the TADF material in response to excitation by excitation radiation from the excitation radiation source device 18.

The radiation detector device 16 can comprise one or more radiation detectors, for example photo detectors (CCD) being sensitive to a least fluorescence that the TADF material can emit.

The computing device 26 of the directional receiver 2 being adapted to compute detection data from the radiation detector device 16 to:
generate one or more data sets;
determine, on the basis of at least the first and second spectral densities, whether the first focused signal v1-v4 is a stable signal;
estimate/determine and/or remove unfocused signals vb in the one or more data sets in the sector of interest and
compute spherical coordinates of the receiver in relation to a coordinate system using the computed pseudo-range to the identified source.

The computing device (26) of the directional receiver (2) according to the present invention may be further adapted to:
determine a speed of the receiver relative to the first identified source by—determining a Doppler shift between
  the first or second determined spectral densities of the first focused signal v1-v4 and
  the known spectral density of the first focused signal v1-v4 of the first source.

The computing device 26 may be further adapted to compute detection data from the radiation detector device 16 to:
determine, in addition to the first focused signal v1-v4, at least
  a second focused signal v1-v4 and
  a third focused signal v1-v4 in the sector of interest,
determine, for each of the at least three focused signals v1-v4, a first spectral density at a first time and a second spectral density at a second time,
determine, on the basis of at least the first and second spectral densities, whether the at least three focused signals v1-v4 are stable signals; and
identify, for each of the at least three focused signals v1-v4, on the basis of at least the first or the second determined spectral density, at least three sources the at least three focused signals v1-v4 originate from;
determine known physical parameters and known spherical coordinates associated with the at least three sources;
determine a phase shift for the at least three focused signals v1-v4,
compute a pseudo-range to the at least three sources based on the determined physical parameters and/or the phase shift;
compute spherical coordinates of the receiver in relation to a coordinate system using the computed pseudo-range to the at least three sources.

The computing device 26 may be further adapted to compute detection data from the radiation detector device 16 to:

determine a speed of the receiver relative to the at least three sources by
determining a Doppler shift between
the first or second determined spectral densities of each of the at least three focused signals v1-v4 and
the known spectral density of the each of the at least three focused signals v1-v4 of the at least three sources.

The computing device 26 may be further adapted to:
discriminate between focused and unfocused signals based on differences of these signals in a spatial and/or a temporal domain in the one or more data sets.

The computing device may be adapted to compute detection data from the radiation detector device (16) to:
determine an angular orientation and/or and an angular speed of the receiver in relation to the coordinate system by measuring a direction and it's variation of
(i) the at least three focused signals in the sector of interest;
(ii) at least one of the at least three focused signals in the sector of interest and the direction to Earths center or/and to the true/magnetic North in relation to the coordinate system.

The receiver 2 may further comprise a device for carrying out time measurements (not shown), such as signal arrival times, of one or more of the determined focused signals to generate corresponding time information associated with the respective focused signal. Time measurements can also be carried out any (one or more) suitable physical parameter mentioned further above instead.

The computing device 26 may generate navigational information by using
the computed spherical coordinates of the receiver in relation to a coordinate system using the computed pseudo-range to the at least three sources along with the time information, or
the computed spherical coordinates of the receiver 2 in relation to a coordinate system using the computed pseudo-range to at least four sources without time information.

The receiver 2 may further comprise a housing accommodating the components of the receiver 2;
the size of the receiver 2 being equal or less than a cubic decimeter and being reducible in size by one or more order(s) of magnitude without performance loss;
the detector device being a CCD camera;
being able to compute detection data from the radiation detector device 16 during and/or following radiation emission form the excitation radiation source device 14,
wherein the CCD camera provides the data set in an image, spatial, frequency and/or time domain;
the one or more data sets being two-dimensional frames comprising focused v1-v4 and unfocused signals vb, wherein the unfocused signals vb in each frame are determined by the computing device by
determining a mean brightness for every pixel in the frame by receiving signals from different sectors of interest and by
computing an average deviation in brightness across each frame and
subtracting the average deviation from each frame,
wherein the receiver 2 further comprises:
a control device for controlling the operation of the excitation radiation sources device, wherein the control device is adapted to operate the excitation radiation source device in a constant emission mode and/or a variable/modifiable emission mode, comprising pulsed and/or periodical emission mode.

The receiving section and/or parts thereof may be placed in the housing for shielding from unwanted radiation and/or electromagnetic interference (EMI). Unwanted radiation being any radiation that will not be used for navigation.

The directional and the discrete receiver may further comprise a device for carrying out time measurements (not shown), such as signal arrival times, of one or more of the determined focused signals to generate corresponding time information associated with the respective focused signal.

Furthermore, the computing device may be adapted to compute time correction information using the determined physical parameters of the identified sources and/or the phase shift.

The optical system may guide, adjust and/or direct the emitted thermally activated delayed fluorescence 28 for the radiation detector device 16.

The 2D data set may be an image (e.g. a CCD frame, having a plurality of pixels) comprising a sum of focused signals (i.e. related to point-like sources) and unfocused signals (e.g. related to background such as relict (or solar) neutrino fluxes). The unfocused signals of this sum may be estimated for every frame in the image as an average deviation across the frame and then subtracted from the frame. This may be referred to as background reduction.

For the directional receiver a special calibration is carried out. For every pixel of the CCD the overall gain of the system (i.e. TADF layer, lens and CCD) is determined.

To do so, the receiver is rotated in arbitrary directions to determine and/or calculate a mean brightness of every pixel in the frame. The gain is then calculated as a ratio between the mean brightness of a pixel and the mean brightness across the frame. Another method would be to keep the receiver stationary, i.e. mounted for some time. Experimental results show that a precise gain calibration can be carried out in such cases for 3-5 sidereal days. This is possible although the receiver is stationary and is due to the Earth's orbital movement around the Sun.

FIG. 3*b* schematically illustrates a discrete receiver 2 according to the present invention.

The discrete receiver 2 is substantially identical to the directional receiver of FIG. 3*a*, except for the optical system 30, the aperture (field of view) and the resulting number of sources therein used for navigation, stellar map creation etc.

As such, the discrete receiver 2 may be used to determine/detect radiation from sources in a greater field of view, e.g. semi omni-directional, as compared to the field of view of the directional receiver. Using the discrete receiver, stellar maps may be created and new sources may be identified. The discrete receiver may thus be used for a navigation system and for navigation.

The discrete receiver 2 for a navigation system, comprises:
a computing device 26,
a receiving section for receiving signals in a substantially semi-omnidirectional sector of interest,
the signals comprising unfocused signals vb and focused signals v1-v4,
a detection layer 12 comprising thermally activated delayed fluorescence TADF material, the thermally activated delayed fluorescence TADF material having a plurality of excitation frequencies,
an excitation radiation source device 14 adapted to emit excitation radiation 18 having at least one of the plurality of excitation frequencies to excite the TADF material, wherein the TADF material exhibiting upon excitation with excitation radiation, a thermally activated delayed fluorescence TADF 28 emission, the TADF material having a TADF emission pattern without exposure to focused signals v1-v4 and exhibiting a different TADF emission pattern with exposure to focused signals v1-v4, a radiation detector device 26 communicatively coupled with the computing device 26, the radiation detector device 16 being adapted to detect TADF emission from the detection layer and provide respective detection data to the computing device 26, the computing device 26 being adapted to compute detection data from the radiation detector device 16 to:

generate one or more data sets;

analyze the focused signals v1-v4 of all sources in the sector of interest to determine the overall frequency pattern in the sector of interest, identify, on the basis of the overall frequency pattern, individual known frequency patterns, match the identified individual frequency patterns to known frequency patterns related to individual known sources, determine/derive known physical parameters and/or spherical coordinates associated with the identified sources;

determine, for each matching frequency pattern, a phase shift of the focused signal of the known source, compute the spherical coordinates of the discrete receiver in relation to a coordinate system.

As illustrated in FIGS. 3a and 3b, one radiation detector device 16 can be employed. However, more than one radiation detector devices 16 can be used, in order to, for example, detect radiation from the detection layer at different locations in the housing 6.

The radiation detector device 16 can have a planar detection surface 20, as illustrated in the drawings. However, radiation detector devices having a, for example, curved detection surface as indicated by the dashed curved detection surface 22 in FIG. 3b.

The size and form of the detection surface can be designed such that it conforms the size and form of a detection layer's emission surface 24 from where detection layer radiation and, particularly, TADF fluorescence can be emitted. This allows capturing and detecting as much radiation from the detection layer as possible.

According to the illustrations of FIGS. 3a and 3b, the detection layer 12 has a single emission surface 24. However, the detection layer 12 may also have two or even more emission surfaces.

The radiation detector device 16 is capable of outputting detection data indicating radiation detected by the radiation detector device 16.

The computing device 26 of the receivers is communicatively coupled with the radiation detector device 16 to, at least, obtain detection data outputted from the radiation detector device 16. Further, the computing device 26 may be arranged to control the radiation detector device 16 and its operation, respectively.

The computing device 26 may be also communicatively coupled with the excitation radiation source device 14 to control the operation thereof.

A communicative coupling between the computing device 26 and another part of the receiver 30 (e.g. the radiation detection device 16 and excitation radiation source device 14) may be wired and/or wireless.

The computing device 26 is adapted, e.g. in the form of respectively designed hardware and/or software, to compute detection data from the radiation detector device 26 in a manner to determine one or more emission patterns resulting from radiation emitted by the detection layer and, particularly, from thermally activated delayed fluorescence from the TADF material.

If applicable, the computing device 26 may control the operation of the excitation radiation source device 14. For example, the excitation radiation source device 14 may be controlled such that it emits excitation radiation 18 synchronized with detection operation of the radiation detector device 26. In some examples, the following procedure may be used: The excitation radiation source device 14 may be operated to emit excitation radiation for a predefined first period of time (e.g. a phase of 1 ms).

Then, during a second predefined period of time (e.g. a phase of 1 ms) no excitation radiation is emitted and the radiation detector device 26 is not activated/operated to detect radiation from the detection layer 12 and, particularly thermally activated delayed fluorescence from the TADF material. This period of time and phase, respectively, allows transition processes to take place in, e.g., the TADF material and/or the hardware components of the receiver.

After that, during a third predefined period of time (e.g. a phase of 3 ms) the radiation detector device 26 is activated/operated to detect radiation from the detection layer 12 and, particularly thermally activated delayed fluorescence from the TADF material.

This procedure can be referred to as radiation detection based on pre-excited TADF material, because in a first phase (also referred to an excitation phase) TADF material is excited by excitation radiation and in a second phase (also referred to a detection phase) TADF emission is detected/sensed on the basis of which focused signals v4 can be detected. Preferably, as indicated above, there is an intermediate phase (also referred to as transition phase) between the excitation phase and the detection phase In other examples, the excitation radiation source device 14 may be operated to emit excitation radiation as pulses of the same or different level and/or with predefined time intervals of the same or varying length in between. Also, the excitation radiation source device 14 may be operated to emit constant excitation radiation (without periods without excitation radiation) of the same level or of at least two different levels (e.g. like a waveform or stepwise).

Generally, any type of one or more TADF material and combinations thereof may employed. An exemplary TADF material used in experiments included an organic luminofor comprising a mixture of fluorescein Natrium and boric acid.

A possible mass ration of the components can be in the range of 1:100,000-1:500.

The components can be mixed and heated to manufacture the exemplary TADF material according to a specific heating profile. The mixed materials are for example heated up a maximal temperature in the range between 200° C. and 260° C. for at least 20 minutes under a pressure below 0.8 bar.

The heating may be performed in pre-molded forms to obtain TAFD material having a predefined shape. Also, after heating the material can be grounded and mixed with a carrier material (e.g. epoxy), after which the resulting material can be formed to get any desired shape (e.g. by applying onto a support surface).

According to receivers of FIGS. 3a and 3b, the TADF material of the detection layer 12 is excited by excitation radiation 18 from the excitation radiation source device 14, and in response thereto, emits thermally activated delayed fluorescence 28. The emitted thermally activated delayed fluorescence 28 impinges onto the radiation detector device 16, which generates respective detection data. The detection data generated by the radiation detector device 16 are computed by the computing device 26 to determine one or more emission patterns resulting from thermally activated delayed fluorescence from the TADF material.

However, two or more radiation detector devices 16 may be used to detect thermally activated delayed fluorescence 28 emitted by the TADF material of the detection layer 12. The detection data respectively generated by the radiation detector devices 16 are computed by the computing device 26 to determine one or more emission patterns resulting from thermally activated delayed fluorescence from the TADF material. Since detection data from two radiation detector devices 16 may be available, the detection data from the different radiation detector devices 16 can be used to compare the one or more emission patterns on one of radiation detector devices 16 with the one or more emission patterns of the other radiation detector device 16.

For example, two and more radiation detector devices 16 can be used for a correlated detection of focused signals v1-v4, wherein, e.g., only synchronized detection data from different radiation detector devices 16. Synchronization may include to operate the radiation detection devices 16 such that their respective detection data are provided at the same time or processed such that detection data generated at the same time and/or in the same time period are processed together. In addition or as alternative, synchronization may include to use together detection data being generated at/in corresponding areas of the respective detection surfaces of the radiation detection devices 16. In addition or as alternative, synchronization may include using detection data being indicative of TADF emission coming from different parts/surfaces of the detection layer 12 and TADF material, respectively, in order to, for example, detect TADF emission from opposing detection layer's surfaces.

As further example, two and more radiation detector devices 16 can be used to distinguish different types of focused signals v1-v4, wherein, e.g., differences between detection data from different radiation detector devices 16 are calculated. More detailed observations in this respect can be find further below with reference to FIGS. 5a and 5b.

In the radiation detection device of FIG. 3a, an optical system 30 is used to collect and/or focus thermally activated delayed fluorescence from the TADF material onto the radiation detector device 16, in order to, for example, avoid "loosing" such radiation from being captured by the radiation detector device.

In any case, the pattern in which thermally activated delayed fluorescence is emitted from the TADF material depends on focused signals reaching the TADF material. As illustrated in FIG. 4, without focused signals v1-v4 reaching the detection layer 12, the TADF material exhibits a more or less homogenous emission pattern 32. If focused signals v1-v4 reach the detection layer 12, the TADF material exhibits a shifted emission pattern 34, wherein the pattern shift depends from the direction of the focused signals v1-v4.

This is further illustrated in FIG. 4b, which shows that focused signals v1-v4 "deform" the homogenous emission pattern 32 to the shifted emission pattern 34. This deformation can be used to determine the direction of incoming focused signals v1-v4.

As shown in FIG. 5a, without focused signals v1-v4, thermally activated delayed fluorescence from the TADF material results in a uniform distribution 36 of photon emission. As illustrated in FIG. 5b, focused signals v1-v4 shift and deform the emission pattern such that a shifted and deformed distribution 38 of photon emission results. For example, in the illustration of FIG. 5b the distances d1 and d2 between corresponding areas of the uniform distribution 36 and the shifted and deformed distribution 38 indicate that the direction along which the underlying focused signals v1-v4 come from.

As known, in response to excitation radiation, generally TADF material exhibits two effects, namely TAFD emission and phosphorensce emission. While phosphorensce emission results from an inter system crossing (ISC) transition, i.e. a transition from the S1 state to the T1 state, TADF emission results from a reverser ISC transition, i.e. a transition from the T1 state to the S1 state.

However, experiments have demonstrated that phosphorensce emission does not show a reaction to external radiation and focused signals v1-v4, respectively; at least the reaction has not impact on the radiation detection based on TAFD emission. Particularly, focused signals v1-v4 do not affect phosphorensce emission of TADF material such shifted emission pattern as shown in FIGS. 4 and 5 results. Rather, the phosphorensce emission pattern remains essential the same. Therefore, phosphorensce emission impinging on the radiation detection device 16 can be considered as essentially constant background light.

Data outputted by the radiation detection device 16 in response to received phosphorensce emission can be compared with background noise and treated in the same way. For example, overall data output from the radiation detection device 16 may be filtered to remove phosphorensce emission related data in order to obtain, as effective radiation detection device output, detection data being indicative of TADF emission.

A calibration that may be carried out for the directional and/or the discrete receiver 2 is referred to as arrangement calibration. Arrangement calibration may be accomplished before or after operating the receiver 2 for signal detection or during such operation of the receiver 2.

Arrangement calibration can be made using known radiation source(s). Examples for possible such radiation sources include radiation sources with known power (e.g. power spectral density) and/or radiation sources with known time/frequency pattern of radiation. Such radiation sources may provide "natural" radiation, for example, cosmic objects with variable radiation and known time pattern of radiation, like e.g. a pulsar, a quasar star, a gamma-ray burst, a super novae, a star system, a variable star, etc., cosmic objects with constant radiation and known time pattern of radiation (e.g. due to earth movement and rotation) like e.g. sun, planets, deep space objects, etc., combination of radiation from such cosmic objects and the like.

On the basis of known radiation source(s), arrangement calibration may include operating the receiver 2 to detect radiation including radiation from one or more known radiation sources, processing (e.g. filtering including for example, digital filtering in time domain and/or correlation filtering) data from the radiation detector device 16 to remove data indicative of radiation not coming from the known radiation source(s) (e.g. data indicating noise, background, unknown radiation) and using the processed data as data for arrangement calibration.

During such an arrangement calibration, the receiver 2 may be kept stationary, i.e. is not moved. The only movement may be caused by Earth's orbital movement around the Sun.

Arrangement calibration can be made using background radiation, e.g. solar/relic neutrinos. Here, a so-called active calibration and so-called passive calibration may be used.

For active arrangement calibration on the basis of background radiation, the receiver 2 may be rotated in all possible directions for some time. Due to the direct activity of the receiver 2 in combination with the rotations thereof, sources directing radiation onto the receiver 2 will sometimes reach the radiation detector device and sometimes not. Thus, the overall data output from the radiation detector device 16 during the time of rotation includes just small peaks above background radiation level. These data peaks can be removed (e.g. filtered) in order to determine background radiation to which the receiver 2 is exposed.

For passive arrangement calibration on the basis of background radiation, a receiver 2 having a field of view wider than the field of interest is used. Such a wider field of view it can be achieved by, for example, using a radiation detector device 16 having a detection surface being large enough to cover more than the field of interest; such a larger detection surface can be obtained by, e.g. matrix photo sensor and/or modulation (for example by rotation/movement of the radiation detector device 16). Data from the radiation detector device 16 will include data indicative of focused signals v1-v4 directed on the detection layer (generally coming from the field of interest) and data indicative of background radiation. Data indicative of background radiation can be removed (e.g. filtered) from data indicative of focused signals v1-v4 directed on the detection layer.

In both active and passive arrangement calibration on the basis of background radiation, information on background radiation may be used for calibration of the receiver 2.

For example, in an experimental setup, the directional receiver received a mix of neutrinos in a rather narrow sector of space (2 by 2 degrees). Therein, the unfocussed signals are related neutrinos from the sun (i.e. solar neutrinos; background) and the focused signals are related neutrinos from many deep space sources (i.e. point-like sources; signals to be used for navigation). The spectral density of the neutrino flux for every point of the sector of space is calculated. The experiment was carried out for 17 days by tracking different areas of space (2×2 degrees) about 1 hour a day. In the data sets, stable signals were found, i.e. signals having a spectral peak of constant frequency, detected in every day of the experiment. This signals were then related/compared and matched to known sources using stellar maps showing the location of known sources in space.

Figure 6B:
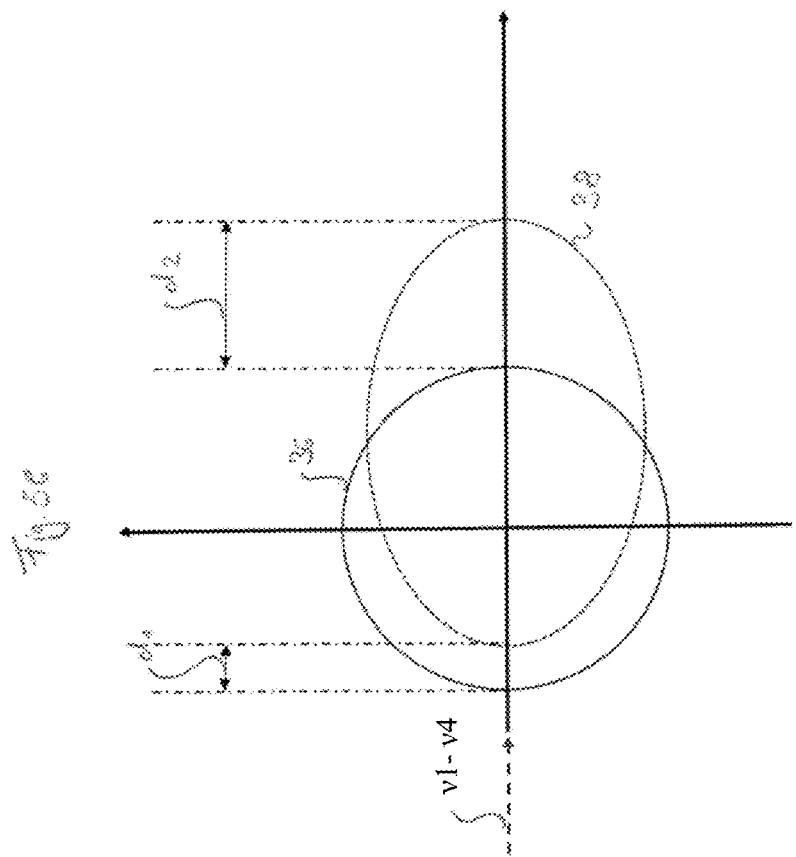
Figure 6A:
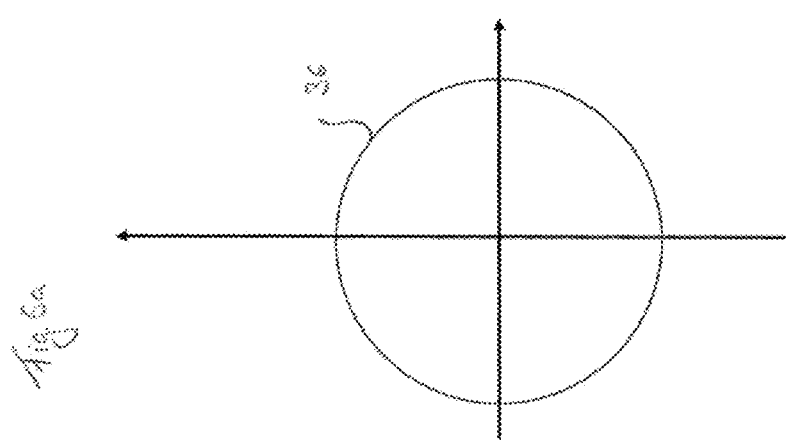
Figure 6B:
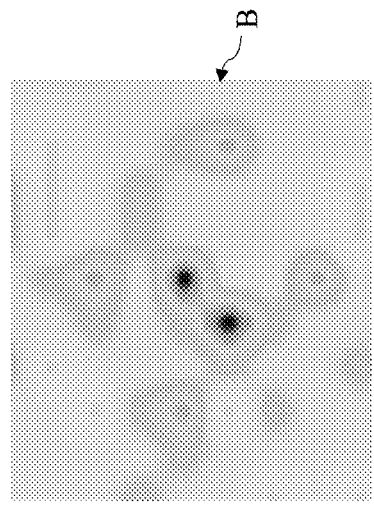
Figure 6A:
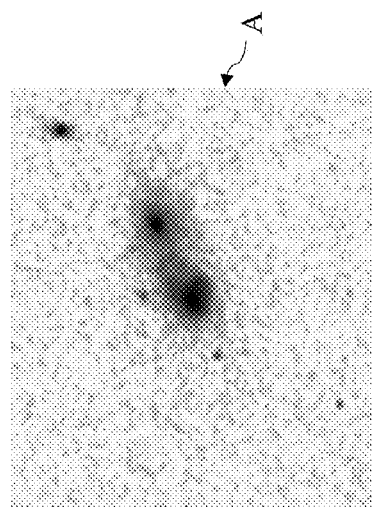

FIGS. 6a and 6b show reproductions of measurements carried out with another conventional infra-red (IR) detector and with a receiver according to the present invention.

The image of FIG. 6a represents the two approaching (interacting or merging) galaxies (NGC1143 and NGC1144) from infra-red measurements by another conventional detector A. The image of FIG. 6a may be used for comparison and analysis with the experimental results of measurements with a receiver according to the present invention.

The image of FIG. 6b shows a graphical representation of detection data obtained during a directional receiver 2 was directed into the sky for 17 days of observation B. For each observation day, the detection data was cumulatively collected and processed to generate a measurement image for the respective day. The 17-day images were cross-correlated and the representation of FIG. 6b was obtained. It should be noted that any other number of days is acceptable, depending on the experiment that will be carried out.

The spherical coordinates of the two galaxies NGC1143 and NGC1144 are in agreement when comparing the measurements of the directional receiver B and the measurements carried out by the conventional IR-detector A. In other words, the two galaxies coordinates are in agreement better than 0.5 degrees when comparing the measurement of the directional receiver B with the measurements of the conventional IR-detector A.

The image detected by the receiver according to FIG. 6b shows more/different sources visible for the interacting galaxies as compared to the sources visible in the infra-red (IR) image of FIG. 6a. As such, the signal power of the two interacting galaxies NGC1143 and NGC11 measured by a receiver according to the present invention may be related to gravitational radiation and/or neutrino radiation or, even yet unknown radiation emitted/radiated therefrom.

The physical parameters of these galaxies are known and have already been determined in various different measurements. Thus, the two interacting galaxies NGC1143 and NGC11 represent possible sources that may be used for navigation using a receiver 2 according to the present invention.

Figure 7:
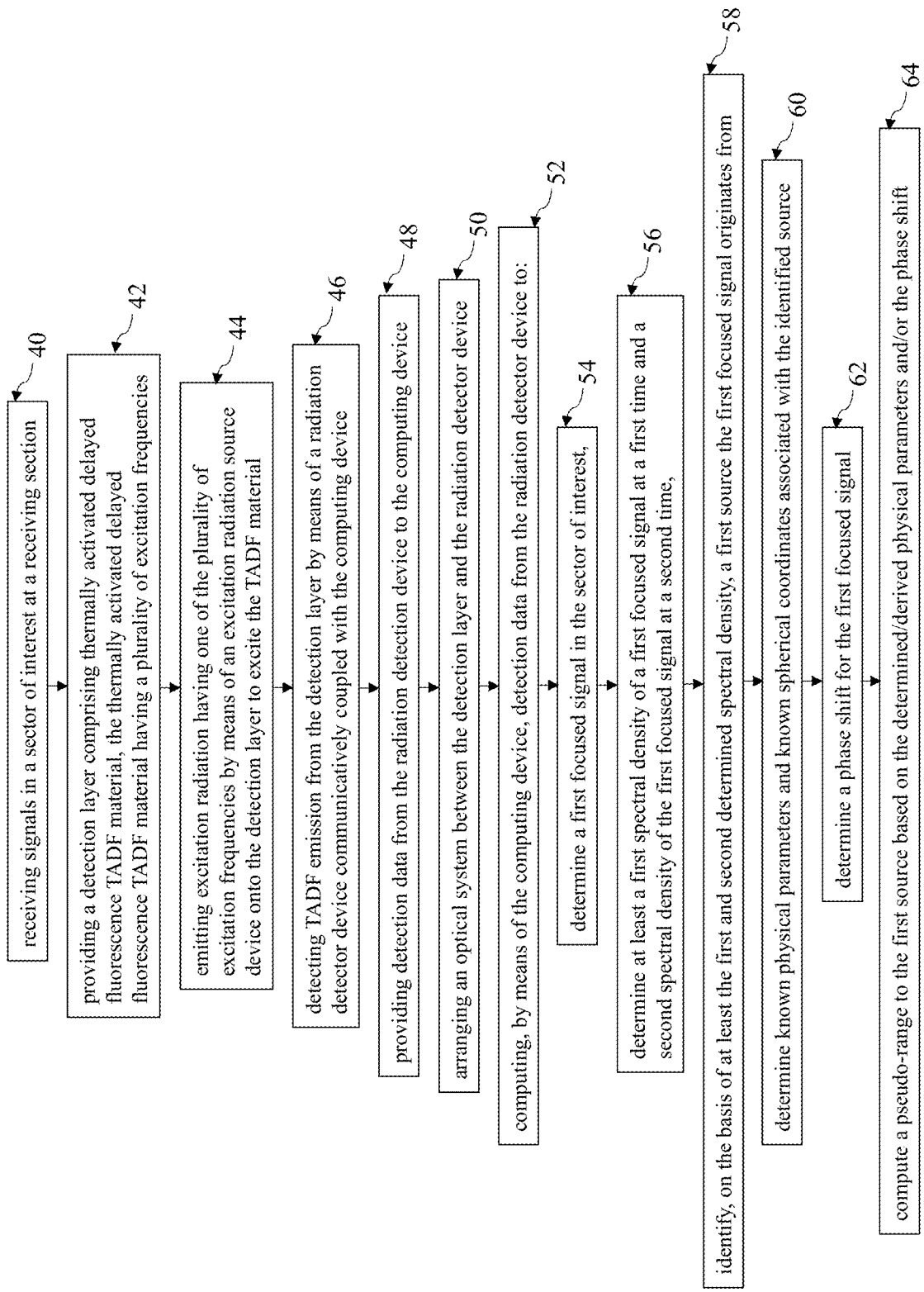

FIG. 7 shows a flow chart of a navigation method using a first signal from a first source according to the invention.

The navigation method may comprise:

Step 40: receiving signals in a sector of interest at a receiving section 13,
   the received signals comprising unfocused signals vb and focused signals v1-v4, Step 42: providing a detection layer 12 comprising thermally activated delayed fluorescence TADF material, the thermally activated delayed fluorescence TADF material having a plurality of excitation frequencies, Step 44: emitting excitation radiation 18 having at least one of the plurality of excitation frequencies by means of an excitation radiation source device 14 onto the detection layer 12 to excite the TADF material, wherein
   the TADF material exhibiting upon excitation with excitation radiation 18, a thermally activated delayed fluorescence TADF emission,
   the TADF material having a TADF emission pattern without exposure to focused signals v1-v4 and exhibiting a different TADF emission pattern with exposure to focused signals v1-v4, Step 46: detecting TADF emission from the detection layer 12 by means of a radiation detector device 16 communicatively coupled with the computing device 26, Step 48: providing detection data from the radiation detection device 16 to the computing device 26, Step 50: arranging an optical system 30 between the detection layer 12 and the radiation detector device 16, wherein the method further comprises Step 52: computing, by means of the computing device 26, detection data from the radiation detector device 16 to:

Step 42: determine a first focused signal v1-v4 in the sector of interest,

Step 56: determine at least a first spectral density of a first focused signal at a first time and a second spectral density of the first focused signal at a second time, Step 58: identify, on the basis of at least the first and second determined spectral density, a first source the first focused signal v1-v4 originates from;

Step 60: determine known physical parameters and known spherical coordinates associated with the identified source;

Step 62: determine a phase shift for the first focused signal v1-v4;

Step 64: compute a pseudo-range to the first source based on the determined/derived physical parameters and/or the phase shift.

The navigation method further comprises computing, by means of the computing device, detection data from the radiation detector device 16 to:
generate one or more data sets;
determine, on the basis of at least the first and second spectral densities, whether the first focused signal v1-v4 is a stable signal;
estimate/determine and/or remove unfocused signals vb in the one or more data sets in the sector of interest.

Figure 8:
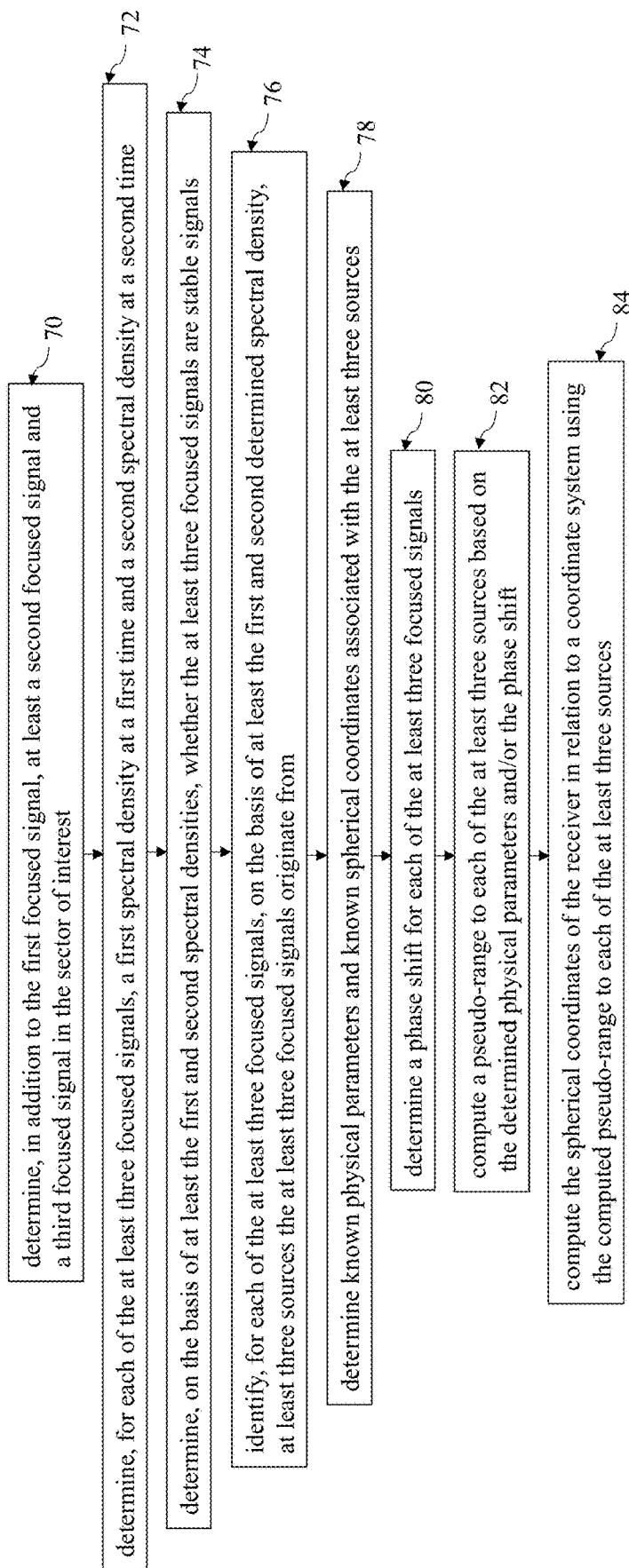

The navigation method further comprises:
determining, using the computing device, a speed of the receiver relative to the first identified source by
determining a Doppler shift between
the first or second determined spectral densities of the first focused signal v1-v4 and
the known spectral density of the first focused signal v1-v4 of the first source;

FIG. 8 shows a flow chart of the navigation method using three signals from three different sources according to the invention.

The method comprises:
computing, by means of the computing device, detection data from the radiation detector device (16) to:
Step 70: determine, in addition to the first focused signal v1-v4, at least
a second focused signal v1-v4 and
a third focused signal v1-v4 in the sector of interest,
Step 72: determine, for each of the at least three focused signals v1-v4, a first spectral density at a first time and a second spectral density at a second time;
Step 74: determine, on the basis of at least the first and second spectral densities, whether the at least three focused signals are stable signals; and
Step 76: identify, for each of the at least three focused signals v1-v4, on the basis of at least the first and second determined spectral density, at least three sources the at least three focused signals v1-v4 originate from;
Step 78: determine known physical parameters and known spherical coordinates associated with the at least three sources;
Step 80: determine a phase shift for each of the at least three focused signals,
Step 82: compute a pseudo-range to each of the at least three sources based on the determined physical parameters and/or the phase shift;
Step 84: compute the spherical coordinates of the receiver in relation to a coordinate system using the computed pseudo-range to each of the at least three sources.

The navigation method may further comprise:
computing, by means of the computing device, detection data from the radiation detector device (16) to:
determine a speed of the receiver relative to the at least three sources by
determining a Doppler shift between
the first or second determined spectral densities of each of the at least three focused signals and
the known spectral density of the each of the at least three focused signals of the at least three sources.

The navigation method may further comprise:
computing, by means of the computing device 26, detection data from the radiation detector device 16 to:
determine an angular orientation and/or and an angular speed of the receiver in relation to the coordinate system by measuring a direction and it's variation of
(i) the at least three focused signals in the sector of interest;
(ii) at least one of the at least three focused signals in the sector of interest and the direction to Earths center or/and to the true/magnetic North in relation to the coordinate system.

The navigation method may further comprise:
carrying out time measurements, such as signal arrival times, for one or more of the determined focused signals to generate corresponding time information associated with the respective focused signal,
navigating using
the computed spherical coordinates of the receiver in relation to a coordinate system using the computed pseudo-range to the at least three sources along with the time information, or
the computed spherical coordinates of the receiver in relation to a coordinate system using the computed pseudo-range to at least four sources without time information.

The navigation method may further comprise:
accommodating the components of the receiver in a housing; wherein
the size of the receiver being equal or less than a cubic decimeter and being reducible in size by one or more order(s) of magnitude without performance loss;
the detector device 16 being a CCD camera;
being able to compute detection data from the radiation detector device (16) during and/or following radiation emission form the excitation radiation source device (14),
wherein the CCD camera provides the data set in an image, spatial, frequency and/or time domain;
the one or more data sets being two-dimensional frames comprising focused and unfocused signals, wherein the unfocused signals in each frame are determined by the computing device by:
determining a mean brightness for every pixel in the frame by receiving signals from different sectors of interest and by
computing an average deviation in brightness across each frame and
subtracting the average deviation from each frame,
wherein the receiver 2 further comprises:
a control device for controlling the operation of the excitation radiation sources device, wherein the control device is adapted to operate the excitation radiation source device in a constant emission mode and/or a variable/modifiable emission mode, comprising pulsed and/or periodical emission mode.

Above, the present invention has been described with reference to detection of radiation (e.g. signals) space born and from outer space, respectively. However, the present invention is not limited to such applications.

This patent arises from a continuing application of U.S. patent application Ser. No. 16/195,326 filed on Nov. 19, 2018, which claims priority to, European Patent Application EP 17 202 468.9, filed Nov. 19, 2017. U.S. patent application Ser. No. 16/195,326 and European Patent Application EP 17 202 468.9 are hereby incorporated herein in its entireties.

| Reference numeral list | |
|---|---|
| S1-S4 | Satellites |
| s1-s4 | Satellite signals |
| v1-v4 | Focused signals (neutrino, gravitational) |
| vb | Unfocused signals (background/noise) |
| R | GNSS Receiver |
| E | Earth |
| a | quasar |
| b | galaxies |
| c | pulsar |
| d | black hole |
| 1 | Conventional global navigation satellite system (GNSS) |
| 2 | Receiver (discrete/directional) |
| 3 | Navigation system according to the present invention |
| 6 | Housing |
| 8 | Shieldable radiation |
| 12 | Detection layer |
| 14 | Excitation radiation source device |
| 16 | Radiation detector device |
| 18 | Excitation radiation |
| 20 | Planar detection surface |
| 22 | Curved detection surface |
| 24 | Detection layer's surface |
| 26 | Computing device |
| 28 | Thermally activated delayed fluorescence |
| 30 | Optical system |
| 32 | Homogenous emission pattern |
| 34 | Shifted emission pattern |
| 36 | Uniform distribution pattern |
| 38 | Shifted and deformed distribution pattern |

The invention claimed is:

1. Directional receiver (2) for a navigation system, comprising:
a computing device (26),
a receiving section for receiving focused and unfocused signals in a sector of interest,
wherein focused signals are comprised of particle radiation and/or gravitational waves,
a detection layer (12) comprising thermally activated delayed fluorescence TADF material, the thermally activated delayed fluorescence TADF material having a plurality of excitation frequencies,
an excitation radiation source device (14) adapted to emit excitation radiation (18) having at least one of the plurality of excitation frequencies to excite the TADF material, wherein
the TADF material exhibiting upon excitation with excitation radiation (18), a thermally activated delayed fluorescence TADF emission,
the TADF material having a TADF emission pattern without exposure to focused signals and exhibiting a different TADF emission pattern with exposure to focused signals,
a radiation detector device (16) communicatively coupled with the computing device (26), the radiation detector device (16) being adapted to detect TADF emission from the detection layer (12) and provide respective detection data to the computing device (26),
an optical system (30) being arranged between the detection layer (12) and the radiation detector device (16),
the computing device (26) being adapted to compute detection data from the radiation detector device (16) to:
generate one or more data sets;
determine a first focused signal, a second focused signal and a third focused signal in the sector of interest, by comparing the TADF emission patterns,
determine, for each of the at least three focused signals a first spectral density at a first time and a second spectral density at a second time,
identify, for each of the at least three focused signals, on the basis of at least the first and second determined spectral density, at least three sources in the sector of interest the at least three focused signals originates from, wherein the first, second and third focused signal at least has stable temporal and/or frequential characteristics;
determine known spectral densities and known spherical coordinates associated with the at least three identified sources the at least three focused signals originate from;
determine a phase shift for the at least three focused signals by comparing first and second spectral density and the known spectral density;
compute a pseudo-range to the at least three sources based on the known spherical coordinates and/or the phase shift
compute spherical coordinates of the receiver in relation to a coordinate system using the computed pseudo-range to the at least three sources.

2. Receiver according to claim 1, wherein the computing device (26) being further adapted to compute detection data from the radiation detector device (16) to:
estimate/determine and/or remove unfocused signals in the one or more data sets in the sector of interest.

3. Receiver according to claim 1, wherein
the unfocused signals being background noise in the sector of interest and
the focused signals being signals originating from point-like sources in the sector of interest;
the point-like sources having known spherical coordinates in relation to the coordinate system and known physical parameters, comprising one or more of the following:
amplitude;
phase;
Doppler shift;
rotational frequency;
jitter;
periodical signal (pulse) shape;
wherein a stable signal being a focused signal having at least one spectral peak of constant frequency.

4. Receiver according to claim 1, wherein the computing device being further adapted to compute detection data from the radiation detector device (16) to:
determine a speed of the receiver relative to the first identified source by determining a Doppler shift between
the first or second determined spectral densities of each of the at least three focused signals and
the known spectral density of each of the at least three focused signals of the at least three sources.

5. Receiver according to claim 1, wherein the computing device being further adapted to compute detection data from the radiation detector device (16) to:
determine a speed of the receiver relative to the at least three sources by
determining a Doppler shift between
the first or second determined spectral densities of each of the at least three focused signals and
the known spectral density of the each of the at least three focused signals of the at least three sources.

6. Receiver according to claim 1, wherein the computing device being further adapted to compute detection data from the radiation detector device (16) to:

determine an angular orientation and/or and an angular speed of the receiver in relation to the coordinate system by measuring a direction and it's variation of
(i) the at least three focused signals in the sector of interest;
(ii) at least one of the at least three focused signals in the sector of interest and the direction to Earths center or/and to the true/magnetic North in relation to the coordinate system.

7. Receiver according to claim 1, further comprising a device for carrying out time measurements, such as signal arrival times, of one or more of the determined focused signals to generate corresponding time information associated with the respective focused signal.

8. Receiver according to claim 1, wherein the computing device generates navigational information by using
the computed spherical coordinates of the receiver in relation to a coordinate system using the computed pseudo-range to the at least three sources along with the time information, or
the computed spherical coordinates of the receiver in relation to a coordinate system using the computed pseudo-range to at least four sources without time information.

9. Receiver (2) according to claim 1, wherein
the receiver further comprises a housing accommodating the components of the receiver;
the size of the receiver being equal or less than a cubic decimeter and being reducible in size by one or more order(s) of magnitude without performance loss;
the detector device (16) being a CCD camera;
being able to compute detection data from the radiation detector device (16) during and/or following radiation emission form the excitation radiation source device (14),
wherein the CCD camera provides the data set in an image, spatial, frequency and/or time domain;
the one or more data sets being two-dimensional frames comprising focused and unfocused signals, wherein the unfocused signals in each frame are determined by the computing device by
determining a mean brightness for every pixel in the frame by receiving signals from different sectors of interest and by
computing an average deviation in brightness across each frame and
subtracting the average deviation from each frame,
wherein the receiver (2) further comprises:
a control device for controlling the operation of the excitation radiation sources device, wherein the control device is adapted to operate the excitation radiation source device in a constant emission mode and/or a variable/modifiable emission mode, comprising pulsed and/or periodical emission mode.

10. Navigation method, comprising:
receiving focused and unfocused signals in a sector of interest at a receiving section, wherein focused signals are comprised of particle radiation and/or gravitational waves,
providing a detection layer (12) comprising thermally activated delayed fluorescence TADF material, the thermally activated delayed fluorescence TADF material having a plurality of excitation frequencies,
emitting excitation radiation (18) having at least one of the plurality of excitation frequencies by means of an excitation radiation source device (14) onto the detection layer to excite the TADF material, wherein
the TADF material exhibiting upon excitation with excitation radiation (18), a thermally activated delayed fluorescence TADF emission,
the TADF material having a TADF emission pattern without exposure to focused signals and exhibiting a different TADF emission pattern with exposure to focused signals,
detecting TADF emission from the detection layer by means of a radiation detector device (16) communicatively coupled with the computing device (26),
providing detection data from the radiation detection device to the computing device (26),
arranging an optical system (30) between the detection layer (12) and the radiation detector device (16), wherein
the method further comprises computing, by means of the computing device, detection data from the radiation detector device (16) to:
generate one or more datasets;
determine a first focused signal, a second focused signal and a third focused signal in the sector of interest by comparing the TADF emission patterns,
determine, for each of the at least three focused signals, at least a first spectral density at a first time and a second spectral density at a second time,
identify, for each of the at least three focused signals, on the basis of at least the first and second determined spectral density, at least three sources in the sector of interest the at least three focused signal originates from, when the first, second and third focused signal at least has stable temporal and/or frequential characteristics;
determine known spectral densities and known spherical coordinates associated with the at least three identified sources the at least three focused signal originates from;
determine a phase shift for each of the at least three focused signals by comparing first and second spectral density and the known spectral density;
compute a pseudo-range to each of the at least three sources based on the known spherical coordinates and/or the phase shift
compute the spherical coordinates of the receiver in relation to a coordinate system using the computed pseudo-range to each of the at least three sources.

11. Navigation method according to claim 10, wherein the method further comprises computing, by means of the computing device, detection data from the radiation detector device (16) to:
estimate/determine and/or remove unfocused signals in the one or more data sets in the sector of interest.

12. Navigation method according to claim 10, further comprising:
computing, by means of the computing device, detection data from the radiation detector device (16) to:
determine a speed of the receiver relative to the at least three sources by
determining a Doppler shift between
the first or second determined spectral densities of each of the at least three focused signals and
the known spectral density of the each of the at least three focused signals of the at least three sources.

13. Navigation method according to claim 10, further comprising:
computing, by means of the computing device, detection data from the radiation detector device (16) to:

determine an angular orientation and/or and an angular speed of the receiver in relation to the coordinate system by measuring a direction and it's variation of
  (i) the at least three focused signal in the sector of interest;
  (ii) at least one of the at least three focused signals in the sector of interest and the direction to Earths center or/and to the true/magnetic North in relation to the coordinate system.

14. Navigation method according to claim 10 further comprising:
  carrying out time measurements, such as signal arrival times, for one or more of the determined focused signals to generate corresponding time information associated with the respective focused signal,
  navigating using
    the computed spherical coordinates of the receiver in relation to a coordinate system using the computed pseudo-range to the at least three sources along with the time information, or
    the computed spherical coordinates of the receiver in relation to a coordinate system using the computed pseudo-range to at least four sources without time information.

15. Navigation method according to claim 10 further comprising
  accommodating the components of the receiver in a housing; wherein
    the size of the receiver being equal or less than a cubic decimeter and being reducible in size by one or more order(s) of magnitude without performance loss;
  the detector device (16) being a CCD camera;
    being able to compute detection data from the radiation detector device (16) during and/or following radiation emission form the excitation radiation source device (14),
    wherein the CCD camera provides the data set in an image, spatial, frequency and/or time domain;
  the one or more data sets being two-dimensional frames comprising focused and unfocused signals,
  wherein the unfocused signals in each frame are determined by the computing device by:
    determining a mean brightness for every pixel in the frame by receiving signals from different sectors of interest and by
    computing an average deviation in brightness across each frame and
    subtracting the average deviation from each frame, wherein the receiver (2) further comprises:
  a control device for controlling the operation of the excitation radiation sources device, wherein the control device is adapted to operate the excitation radiation source device in a constant emission mode and/or a variable/modifiable emission mode, comprising pulsed and/or periodical emission mode.

* * * * *

UNITED STATES PATENT AND TRADEMARK OFFICE
CERTIFICATE OF CORRECTION

| | | |
|---|---|---|
| PATENT NO. | : 10,908,289 B2 | Page 1 of 1 |
| APPLICATION NO. | : 16/418688 | |
| DATED | : February 2, 2021 | |
| INVENTOR(S) | : Oxana Margaritova et al. | |

It is certified that error appears in the above-identified patent and that said Letters Patent is hereby corrected as shown below:

In the Claims

Claim 1, Column 30, Line 7 from the word "originates" delete "s"

Claim 10, Column 32, Line 31 from the word "originates" delete "s"

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*